US012726236B2

(12) United States Patent
Sriram et al.

(10) Patent No.: US 12,726,236 B2
(45) Date of Patent: Sep. 1, 2026

(54) REDUCED OVERHEAD LOOP BACK MESSAGING (LBM) FOR PACKET-BASED FRONTHAUL INTERFACE

(71) Applicant: Outdoor Wireless Networks LLC, Richardson, TX (US)

(72) Inventors: Suresh N. Sriram, Bangalore (IN); Sudarshana Varadappa, Bangalore (IN); Yogesh C.S, Bengaluru (IN); Emil Mathew Kadavil, Bangalore (IN); Syamala Saripalli, Bangalore (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 54 days.

(21) Appl. No.: 18/875,061

(22) PCT Filed: Jun. 5, 2023

(86) PCT No.: PCT/US2023/024488
§ 371 (c)(1),
(2) Date: Dec. 13, 2024

(87) PCT Pub. No.: WO2023/244459
PCT Pub. Date: Dec. 21, 2023

(65) Prior Publication Data

US 2025/0357972 A1 Nov. 20, 2025

Related U.S. Application Data

(60) Provisional application No. 63/386,462, filed on Dec. 7, 2022.

(30) Foreign Application Priority Data

Jun. 14, 2022 (IN) ............................ 202241033988

(51) Int. Cl.
*H04B 7/02* (2018.01)
*H04B 7/024* (2017.01)

(52) U.S. Cl.
CPC .................................... *H04B 7/024* (2013.01)

(58) Field of Classification Search
CPC .... H04B 7/024; H04L 43/0811; H04W 24/08; H04W 88/085
See application file for complete search history.

(56) References Cited

U.S. PATENT DOCUMENTS 9,448,576 B2 9/2016 Chamberlain et al.
10,812,664 B2 10/2020 Kostakis et al.
(Continued)

FOREIGN PATENT DOCUMENTS

WO 2023244459 A1 12/2023

OTHER PUBLICATIONS

International Searching Authority, "International Search Report and Written Opinion", dated Sep. 21, 2023, from PCT Application No. PCT/US2023/024488, pp. 1 through 10, Published: WO.
(Continued)

*Primary Examiner* — Dac V Ha
(74) *Attorney, Agent, or Firm* — Fogg & Powers LLC

(57) ABSTRACT

One embodiment is directed to a radio access network (RAN) comprising a distributed unit (DU) and one or more radio units (RUs) coupled to the DU over a fronthaul network. The RAN is configured to verify and monitor the transport connectivity between the DU and at least one RU using at least one of control-plane or user-plane messages communicated over the fronthaul network for a purpose other than verifying or monitoring the transport connectivity between the DU and said at least one RU. Other embodiments are disclosed.

20 Claims, 10 Drawing Sheets

(56) References Cited

U.S. PATENT DOCUMENTS

| | | | |
|---|---|---|---|
| 11,129,095 | B2 | 9/2021 | Gandhi |
| 12,120,764 | B2 * | 10/2024 | Gundavelli ........... H04W 40/20 |
| 12,401,570 | B2 * | 8/2025 | Krishnan ........... H04B 17/3912 |
| 2017/0201438 | A1 | 7/2017 | Hazani |
| 2021/0120437 | A1 | 4/2021 | Rosenschild et al. |
| 2021/0120527 | A1 | 4/2021 | Rhim et al. |
| 2022/0141876 | A1 | 5/2022 | Gorain et al. |
| 2025/0192831 | A1 * | 6/2025 | Jeon ..................... H04B 7/0617 |
| 2025/0240104 | A1 * | 7/2025 | Vaez-Ghaemi .... H04B 10/0799 |

OTHER PUBLICATIONS

O-RAN Alliance, O-RAN Working Group 4 (Open Fronthaul Interfaces WG) Management Plan Specification, O-RAN-WG4.MP.0-V09.00. Technical Specification, Apr. 18, 2022, pp. Title Page through 231.

European Patent Office, "Extended European Search Report", dated Feb. 20, 2026, from EP Application No. 23824420.6, from Foreign Counterpart to U.S. Appl. No. 18/875,061, pp. 1 through 9, Published: EP.

O-RAN Working Group 4 (Open Fronthaul Interfaces WG), "Control, User and Synchronization Plane Specification, O-RAN3WG4.CUS.0-v07.02", May 31, 2022, pp. 1 through 319, Part 1 of 3.

O-RAN Working Group 4 (Open Fronthaul Interfaces WG), "Control, User and Synchronization Plane Specification, O-RAN3WG4.CUS.0-v07.02", May 31, 2022, pp. 1 through 319, Part 2 of 3.

O-RAN Working Group 4 (Open Fronthaul Interfaces WG), "Control, User and Synchronization Plane Specification, O-RAN3WG4.CUS.0-v07.02", May 31, 2022, pp. 1 through 319, Part 3 of 3.

* cited by examiner

800

REDUCED OVERHEAD LOOP BACK MESSAGING (LBM) FOR PACKET-BASED FRONTHAUL INTERFACE

CROSS-REFERENCE TO RELATED APPLICATIONS

This application is a 371 National Stage Application of International Application No. PCT/US2023/024488, filed on Jun. 5, 2023, and titled "REDUCED OVERHEAD LOOP BACK MESSAGING (LBM) FOR PACKET-BASED FRONTHAUL INTERFACE", which claims priority to U.S. Provisional Application No. 63/386,462, filed Dec. 7, 2022, and titled "REDUCED OVERHEAD LOOP BACK MESSAGING (LBM) FOR PACKET-BASED FRONTHAUL INTERFACE," and also claims priority to IN Provisional Application No. 202241033988, filed Jun. 14, 2022, and titled "REDUCED OVERHEAD LOOP BACK MESSAGING (LBM) FOR PACKET-BASED FRONTHAUL INTERFACE," the contents of each of which are hereby incorporated by reference in their entireties.

BACKGROUND

The 3GPP fifth generation (5G) radio access network (RAN) architecture includes a set of base stations (also referred to as "gNBs") connected to the 5G core network (5GC) and to each other. Each gNB typically comprises three entities—a centralized unit (CU), a distributed unit (DU), and a set of one or more radio units (RUs). The CU can be further split into one or more CU control plane entities (CU-CPs) and one or more CU user plane entities (CU-UPs). The functions of the RAN can be split among these entities in various ways. For example, the functional split between the DU and the RUs can be configured so that the DU implements some of the Layer-1 processing functions (for the wireless interface) and each RU implements the Layer-1 functions that are not implemented in the DU as well as the basic RF and antenna functions. The DU is coupled to each RU using a fronthaul network (for example, one implemented using a switched Ethernet network) over which data is communicated between the DU and each RU including, for example, user-plane data (for example, in-phase and quadrature (IQ) data representing time-domain or frequency-domain symbols). One example of such a configuration is a "Cloud RAN" configuration in which each CU and DU are associated with multiple RUs.

Some fronthaul interfaces used for communicating data over the fronthaul network specify that the DU and each RU exchange messages over the fronthaul network in order to verify the transport connectivity between them.

One example of such a fronthaul interface is promulgated by the O-RAN Alliance. This fronthaul interface is also referred to as the "O-RAN fronthaul interface." The O-RAN fronthaul interfaces specify that, for some configurations, the DU and each associated RU support the Loop-back Protocol (LB/LBM) as defined by IEEE 802.1Q (amendment 802.1ag) when Ethernet is used control-plane/user-plane sessions and the User Datagram Protocol (UDP) Echo Protocol, as defined by RFC 862. For example, the LBM protocol involves the DU sending each RU a Loopback Message (LBM) over the fronthaul network and, in response to receiving a LBM, each RU transmits a responsive Loop-back Response message (LBR). The DU receives each LBR and uses it to verify the transport connectivity with the corresponding RU.

This transport verification is performed during initial RU configuration to validate the transport configuration and at runtime (for example, periodically) in order to monitor network connectivity.

The O-RAN fronthaul interface (and similar fronthaul interfaces) can be used in a distributed antenna system. A distributed antenna system (DAS) typically includes one or more central units or nodes (also referred to here as "central access nodes (CANs)" or "master units") that are communicatively coupled to a plurality of remotely located access points or antenna units (also referred to here as "remote units" or "radio units"), where each access point can be coupled directly to one or more of the central access nodes or indirectly via one or more other remote units and/or via one or more intermediary or expansion units or nodes (also referred to here as "transport expansion nodes (TENs)"). A DAS is typically used to improve the coverage provided by one or more base stations that are coupled to the central access nodes. These base stations can be coupled to the one or more central access nodes via one or more cables or via a wireless connection, for example, using one or more donor antennas. The wireless service provided by the base stations can include commercial cellular service and/or private or public safety wireless communications.

In general, each central access node receives one or more downlink signals from one or more base stations and generates one or more downlink transport signals derived from one or more of the received downlink base station signals. Each central access node transmits one or more downlink transport signals to one or more of the access points. Each access point receives the downlink transport signals transmitted to it from one or more central access nodes and uses the received downlink transport signals to generate one or more downlink radio frequency signals that are radiated from one or more coverage antennas associated with that access point. The downlink radio frequency signals are radiated for reception by user equipment (UEs). Typically, the downlink radio frequency signals associated with each base station are simulcasted from multiple remote units. In this way, the DAS increases the coverage area for the downlink capacity provided by the base stations.

Likewise, each access point receives one or more uplink radio frequency signals transmitted from the user equipment. Each access point generates one or more uplink transport signals derived from the one or more uplink radio frequency signals and transmits them to one or more of the central access nodes. Each central access node receives the respective uplink transport signals transmitted to it from one or more access points and uses the received uplink transport signals to generate one or more uplink base station radio frequency signals that are provided to the one or more base stations associated with that central access node. Typically, this involves, among other things, summing uplink signals received from all of the multiple access points in order to produce the base station signal provided to each base station. In this way, the DAS increases the coverage area for the uplink capacity provided by the base stations.

Transport connectivity verification between a master unit and each access point of the DAS can be performed using the LBM or UDP Echo protocol (or similar protocol in which a request is sent to from a DU or master unit to each RU or access point and a response is sent from each RU or access point to the DU or master unit).

The processing and bandwidth required to handle such LBM (or similar transport connectivity verification or monitoring) messages increases as the number of RU or access points increases. In RAN or DAS configurations with a large number of RUs or access points, the processing and bandwidth overhead associated with communicating such LBM (or similar transport connectivity verification or monitoring) messages can be significant.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a radio access network (RAN) comprises a distributed unit (DU) and one or more radio units (RUs) coupled to the DU over a fronthaul network. The RAN is configured to verify and monitor the transport connectivity between the DU and at least one RU using at least one of control-plane or user-plane messages communicated over the fronthaul network for a purpose other than verifying or monitoring the transport connectivity between the DU and said at least one RU. The RAN can be configured to verify and monitor the transport connectivity between the DU and at least one RU using at least one of control-plane or user-plane messages communicated over the fronthaul network in connection with over-the-air (OTA) wireless communication related to one or more of a Synchronization Signal Block (SSB), a Master Information Block (MIB), and a Physical Random Access Channel (PRACH). An O-RAN fronthaul interface can be used for communicating the user-plane and control-plane messages over the fronthaul network Another embodiment is directed to a distributed antenna system (DAS) configured to serve a base station. The DAS comprises a master unit and a plurality of access points coupled to the master unit over a fronthaul network. The DAS is configured to verify and monitor the transport connectivity between the master unit and at least one access point using at least one of control-plane or user-plane messages communicated over the fronthaul network for a purpose other than verifying or monitoring the transport connectivity between the master unit and said at least one access point. The DAS can be configured to verify and monitor the transport connectivity between the master unit and said at least one access point using at least one of control-plane or user-plane messages communicated over the fronthaul network in connection with over-the-air (OTA) wireless communication related to one or more of a Synchronization Signal Block (SSB), a Master Information Block (MIB), and a Physical Random Access Channel (PRACH). An O-RAN fronthaul interface can be used for communicating the user-plane and control-plane messages over the fronthaul network.

In another embodiment, a method for monitoring transport connectivity information between entities of a radio access network (RAN) or distributed antenna system (DAS) is disclosed. The method comprises receiving, as part of a standard messaging protocol distinct from a connectivity communications protocol, at least one of a user-plane message or control-plane message at an entity of the RAN or DAS. The method also comprises generating, from the user-plane message or control-plane message, a modified message including transport connectivity information of the entity. The method also comprises transmitting the modified message to another entity of the RAN or DAS via the standard messaging protocol.

Other embodiments can be implemented in other ways.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as further described with reference to the detailed description.

Figure 1:
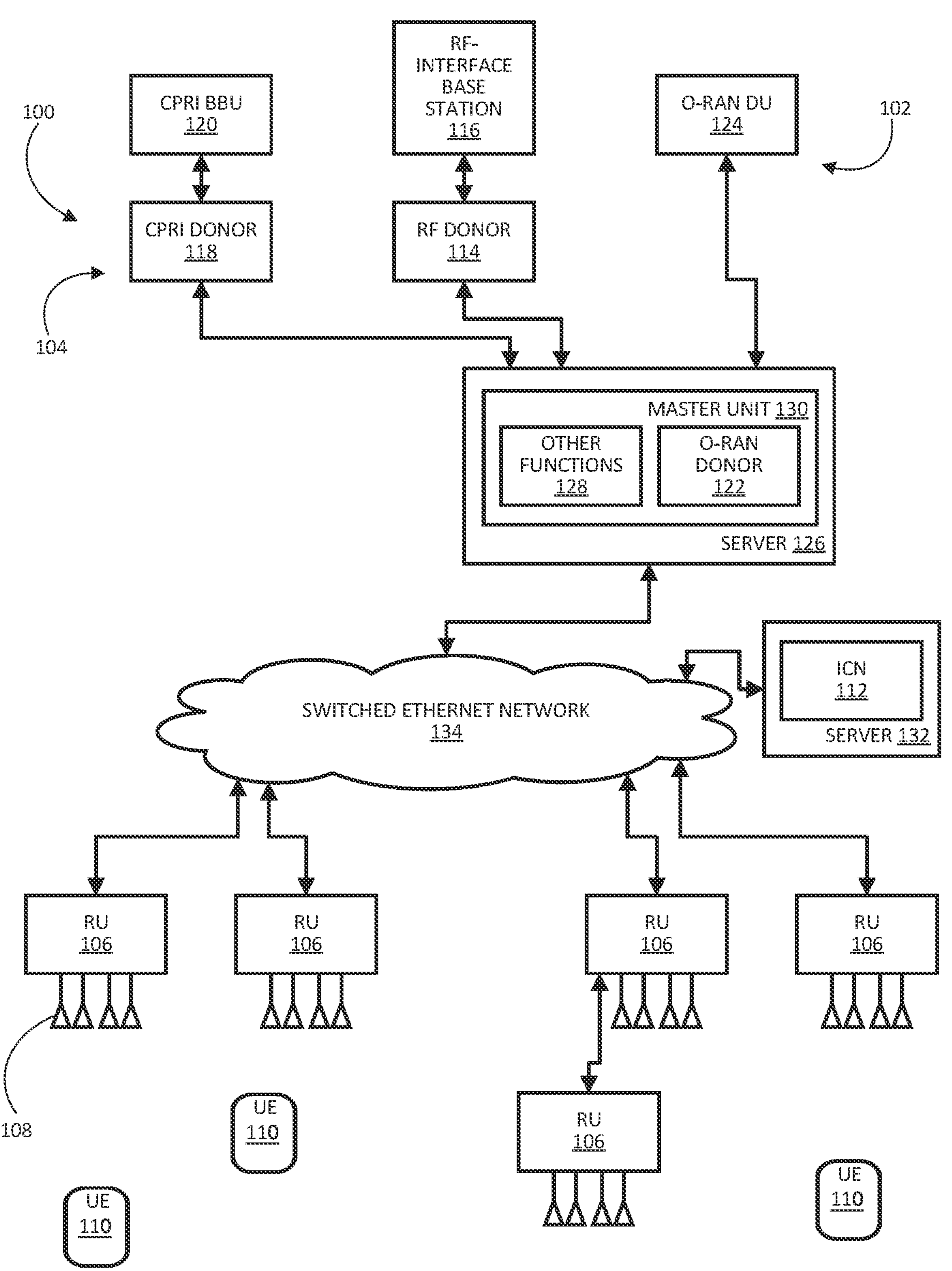
FIGS. 1-4 are block diagrams illustrating one exemplary embodiment of a virtualized DAS (vDAS).

In accordance with common practice, the various described features are drawn to emphasize specific features relevant to the exemplary embodiments. The term "exemplary" merely indicates the accompanying description is used as an example, rather than implying an ideal, essential, or preferable feature of the invention.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure are directed to transmitting connectivity information about entities in a RAN or DAS using non-connectivity messaging protocols that are used to communicate user-plane and control-plane messaging instead of connectivity messaging protocols that are separate from the user-plane and control-plane messaging protocols. That is, instead of transmitting connectivity information between one or more entities in a RAN or DAS using a separate protocol designed for communicating connectivity information, the connectivity information is transmitted as part of the control-plane and user-plane messages communicated between entities in the RAN or DAS. In doing so, connectivity information can be transmitted between entities with fewer messages, thereby reducing the power consumption and processing throughput of the RAN or DAS. For example, where a DU is connected to several (e.g., dozens) of RUs, transmitting connectivity information using the same messaging protocols necessary for transmitting downlink/uplink control-plane and user-plane information between entities can significantly reduce the processing needed to operate the RAN or DAS.

Embodiments of the proposed solution generally involve the following: (1) not sending explicit LBM messages for per-RU or per-access-point transport connectivity verification or monitoring and (2) instead, using control-plane and user-plane messages that are transmitted over the fronthaul network for other purposes in order to verify and monitor the transport connectivity between a DU and each RU in a RAN and/or to verify and monitor the transport connectivity between a master unit and each access point in DAS.

For example, the relevant 3GPP Specifications require mandatory over-the-air (OTA) signals, messages, and channels. User-plane and control-plane messages associated with such OTA signals are communicated over the fronthaul network. For example, control-plane or user-plane messages are communicated over the fronthaul network in connection with over-the-air (OTA) wireless communication related to the Synchronization Signal Block (SSB), the Master Information Block (MIB), and the Physical Random Access Channel (PRACH) used for wirelessly communicating with user equipment (UE). The control-plane and user-plane messages communicated over the front haul network for such OTA signals, messages, and channels can also be used to verify and monitor the transport connectivity between a DU and each RU in a RAN and/or to verify and monitor the transport connectivity between a master unit and each access point in DAS.

Because these control-plane and user-plane messages are already communicated over the front haul network for other purposes, using these same messages to verify and monitor transport connectivity avoids having to send additional messages to do so. This reduces fronthaul bandwidth and processor usage associated compared to using conventional LBM techniques which involves transmitting separate (overhead) messages to verify and monitor the transport connectivity.

The techniques described here can be used to verify and monitor the transport connectivity between a DU and each RU in a RAN and/or to verify and monitor the transport connectivity between a master unit and each access point in DAS. In the case of a DAS, the techniques described here can be used to verify and monitor the transport connectivity between a master unit and each access point in DAS, but where the DAS (which serves as a "RU" from the perspective of the donor DU) uses conventional LBM (or similar) messaging with the donor DU so that the donor DU can monitor and/or verify the connectivity between the donor DU and the DAS. In such an example, the donor DU and the corresponding master unit of the DAS uses conventional LBM messaging (with the master unit of the DAS sending LBR messages as if it were a RU), whereas the master unit uses the techniques described within the DAS in order to verify and monitor the transport connectivity between the master unit and each access point of the DAS.

These techniques can be used in digital DAS. For example, the techniques can be used in the virtualized DAS described below. It is to be understood that these techniques can be used in other types of DASs such as more traditional DASs (for example, non-virtualized DASs).

FIG. 1 is a block diagram illustrating an exemplary embodiment of a distributed antenna system (DAS) 100 that is configured to serve one or more base stations 102. In the exemplary embodiment shown in FIG. 1, the DAS 100 includes one or more donor units 104 that are used to couple the DAS 100 to the base stations 102. The DAS 100 also includes a plurality of remotely located radio units (RUS) 106 (also referred to as "antenna units," "access points," "remote units," or "remote antenna units"). The RUs 106 are communicatively coupled to the donor units 104.

Each RU 106 includes, or is otherwise associated with, a respective set of coverage antennas 108 via which downlink analog RF signals can be radiated to user equipment (UEs) 110 and via which uplink analog RF signals transmitted by UEs 110 can be received. The DAS 100 is configured to serve each base station 102 using a respective subset of RUs 106 (which may include less than all of the RUs 106 of the DAS 100). Also, the subsets of RUs 106 used to serve the base stations 102 may differ from base station 102 to base station 102. The subset of RUs points 106 used to serve a given base station 102 is also referred to here as the "simulcast zone" for that base station 102. In general, the wireless coverage of a base station 102 served by the DAS 100 is improved by radiating a set of downlink RF signals for that base station 102 from the coverage antennas 108 associated with the multiple RUs 106 in that base station's stations simulcast zone and by producing a single "combined" set of uplink base station signals or data that is provided to that base station 102. The single combined set of uplink base station signals or data is produced by a combining or summing process that uses inputs derived from the uplink RF signals received via the coverage antennas 108 associated with the RUs 106 in that base station's simulcast zone.

The DAS 100 can also include one or more intermediary combining nodes (ICNs) 112 (also referred to as "expansion" units or nodes). For each base station 102 served by a given ICN 112, the ICN 112 is configured to receive a set of uplink transport data for that base station 102 from a group of "southbound" entities (that is, from RUs 106 and/or other ICNs 112) and generate a single set of combined uplink transport data for that base station 102, which the ICN 112 transmits "northbound" towards the donor unit 104 serving that base station 102. The single set of combined uplink transport data for each served base station 102 is produced by a combining or summing process that uses inputs derived from the uplink RF signals received via the coverage antennas 108 of any southbound RUs 106 included in that base station's simulcast zone. As used here, "southbound" refers to traveling in a direction "away," or being relatively "farther," from the donor units 104 and base stations 102, and "northbound" refers to traveling in a direction "towards", or being relatively "closer" to, the donor units 104 and base stations 102.

In some configurations, each ICN 112 also forwards downlink transport data to the group of southbound RUs 106 and/or ICNs 112 served by that ICN 112. Generally, ICNs 112 can be used to increase the number of RUs 106 that can be served by the donor units 104 while reducing the processing and bandwidth load relative to having the additional RUs 106 communicate directly with each such donor unit 104.

Also, one or more RUs 106 can be configured in a "daisy-chain" or "ring" configuration in which transport data for at least some of those RUs 106 is communicated via at least one other RU 106. Each RU 106 would also perform the combining or summing process for any base station 102 that is served by that RU 106 and one or more of the southbound entities subtended from that RU 106. (Such a RU 106 also forwards northbound all other uplink transport data received from its southbound entities.)

The DAS 100 can include various types of donor units 104. One example of a donor unit 104 is an RF donor unit 114 that is configured to couple the DAS 100 to a base station 116 using the external analog radio frequency (RF)

interface of the base station 116 that would otherwise be used to couple the base station 116 to one or more antennas (if the DAS 100 were not being used). This type of base station 116 is also referred to here as an "RF-interface" base station 116. An RF-interface base station 116 can be coupled to a corresponding RF donor unit 114 by coupling each antenna port of the base station 116 to a corresponding port of the RF donor unit 114.

Each RF donor unit 114 serves as an interface between each served RF-interface base station 116 and the rest of the DAS 100 and receives downlink base station signals from, and outputs uplink base station signals to, each served RF-interface base station 116. Each RF donor unit 114 performs at least some of the conversion processing necessary to convert the base station signals to and from the digital fronthaul interface format natively used in the DAS 100 for communicating time-domain baseband data. The downlink and uplink base station signals communicated between the RF-interface base station 116 and the donor unit 114 are analog RF signals. Also, in this example, the digital fronthaul interface format natively used in the DAS 100 for communicating time-domain baseband data can comprise the O-RAN fronthaul interface, a CPRI or enhanced CPRI (eCPRI) digital fronthaul interface format, or a proprietary digital fronthaul interface format (though other digital fronthaul interface formats can also be used).

Another example of a donor unit 104 is a digital donor unit that is configured to communicatively couple the DAS 100 to a baseband entity using a digital baseband fronthaul interface that would otherwise be used to couple the baseband entity to a radio unit (if the DAS 100 were not being used). In the example shown in FIG. 1, two types of digital donor units are shown.

The first type of digital donor unit comprises a digital donor unit 118 that is configured to communicatively couple the DAS 100 to a baseband unit (BBU) 120 using a time-domain baseband fronthaul interface implemented in accordance with a Common Public Radio Interface ("CPRI") specification. This type of digital donor unit 118 is also referred to here as a "CPRI" donor unit 118, and this type of BBU 120 is also referred to here as a CPRI BBU 120. For each CPRI BBU 120 served by a CPRI donor unit 118, the CPRI donor unit 118 is coupled to the CPRI BBU 120 using the CPRI digital baseband fronthaul interface that would otherwise be used to couple the CPRI BBU 120 to a CPRI remote radio head (RRH) (if the DAS 100 were not being used). A CPRI BBU 120 can be coupled to a corresponding CPRI donor unit 118 via a direct CPRI connection.

Each CPRI donor unit 118 serves as an interface between each served CPRI BBU 120 and the rest of the DAS 100 and receives downlink base station signals from, and outputs uplink base station signals to, each CPRI BBU 120. Each CPRI donor unit 118 performs at least some of the conversion processing necessary to convert the CPRI base station data to and from the digital fronthaul interface format natively used in the DAS 100 for communicating time-domain baseband data. The downlink and uplink base station signals communicated between each CPRI BBU 120 and the CPRI donor unit 118 comprise downlink and uplink fronthaul data generated and formatted in accordance with the CPRI baseband fronthaul interface.

The second type of digital donor unit comprises a digital donor unit 122 that is configured to communicatively couple the DAS 100 to a BBU using a frequency-domain baseband fronthaul interface implemented in accordance with a O-RAN Alliance specification. The acronym "O-RAN" is an abbreviation for "Open Radio Access Network." This type of digital donor unit 122 is also referred to here as an "O-RAN" donor unit 122, and this type of BBU is typically an O-RAN distributed unit (DU) and is also referred to here as an O-RAN DU 124. For each O-RAN DU 124 served by a O-RAN donor unit 122, the O-RAN donor unit 122 is coupled to the O-DU 124 using the O-RAN digital baseband fronthaul interface that would otherwise be used to couple the O-RAN DU 124 to a O-RAN RU (if the DAS 100 were not being used). An O-RAN DU 124 can be coupled to a corresponding O-RAN donor unit 122 via a switched Ethernet network. Alternatively, an O-RAN DU 124 can be coupled to a corresponding O-RAN donor unit 122 via a direct Ethernet or CPRI connection.

Each O-RAN donor unit 122 serves as an interface between each served O-RAN DU 124 and the rest of the DAS 100 and receives downlink base station signals from, and outputs uplink base station signals to, each O-RAN DU 124. Each O-RAN donor unit 122 performs at least some of any conversion processing necessary to convert the base station signals to and from the digital fronthaul interface format natively used in the DAS 100 for communicating frequency-domain baseband data. The downlink and uplink base station signals communicated between each O-RAN DU 124 and the O-RAN donor unit 122 comprise downlink and uplink fronthaul data generated and formatted in accordance with the O-RAN baseband fronthaul interface, where the user-plane data comprises frequency-domain baseband IQ data. Also, in this example, the digital fronthaul interface format natively used in the DAS 100 for communicating O-RAN fronthaul data is the same O-RAN fronthaul interface used for communicating base station signals between each O-RAN DU 124 and the O-RAN donor unit 122, and the "conversion" performed by each O-RAN donor unit 122 (and/or one or more other entities of the DAS 100) includes performing any needed "multicasting" of the downlink data received from each O-RAN DU 124 to the multiple RUs 106 in a simulcast zone for that O-RAN DU 124 (for example, by communicating the downlink fronthaul data to an appropriate multicast address and/or by copying the downlink fronthaul data for communication over different fronthaul links) and performing any need combining or summing of the uplink data received from the RUs 106 to produce combined uplink data provided to the O-RAN DU 124. It is to be understood that other digital fronthaul interface formats can also be used.

In general, the various base stations 102 are configured to communicate with a core network (not shown) of the associated wireless operator using an appropriate backhaul network (typically, a public wide area network such as the Internet). Also, the various base stations 102 may be from multiple, different wireless operators and/or the various base stations 102 may support multiple, different wireless protocols and/or RF bands.

In general, for each base station 102, the DAS 100 is configured to receive a set of one or more downlink base station signals from the base station 102 (via an appropriate donor unit 104), generate downlink transport data derived from the set of downlink base station signals, and transmit the downlink transport data to the RUs 106 in the base station's simulcast zone. For each base station 102 served by a given RU 106, the RU 106 is configured to receive the downlink transport data transmitted to it via the DAS 100 and use the received downlink transport data to generate one or more downlink analog radio frequency signals that are radiated from one or more coverage antennas 108 associated with that RU 106 for reception by user equipment 110. In this way, the DAS 100 increases the coverage area for the downlink capacity provided by the base stations 102. Also, for any southbound entities (for example, southbound RUs 106 or ICNs 112) coupled to the RU 106 (for example, in a daisy chain or ring architecture), the RU 106 forwards any downlink transport data intended for those southbound entities towards them.

For each base station 102 served by a given RU 106, the RU 106 is configured to receive one or more uplink radio frequency signals transmitted from the user equipment 110. These signals are analog radio frequency signals and are received via the coverage antennas 108 associated with that RU 106. The RU 106 is configured to generate uplink transport data derived from the one or more remote uplink radio frequency signals received for the served base station 102 and transmit the uplink transport data northbound towards the donor unit 104 coupled to that base station 102.

For each base station 102 served by the DAS 100, a single "combined" set of uplink base station signals or data is produced by a combining or summing process that uses inputs derived from the uplink RF signals received via the RUs 106 in that base station's simulcast zone. The resulting final single combined set of uplink base station signals or data is provided to the base station 102. This combining or summing process can be performed in a centralized manner in which the combining or summing process is performed by a single unit of the DAS 100 (for example, a donor unit 104 or master unit 130). This combining or summing process can also be performed in a distributed or hierarchical manner in which the combining or summing process is performed by multiple units of the DAS 100 (for example, a donor unit 104 (or master unit 130) and one or more ICNs 112 and/or RUs 106). Each unit of the DAS 100 that performs the combining or summing process for a given base station 102 receives uplink transport data from that unit's southbound entities and uses that data to generate combined uplink transport data, which the unit transmits northbound towards the base station 102. The generation of the combined uplink transport data involves, among other things, extracting in-phase and quadrature (IQ) data from the received uplink transport data and performing a combining or summing process using any uplink IQ data for that base station 102 in order to produce combined uplink IQ data.

Some of the details regarding how base station signals or data are communicated and transport data is produced vary based on which type of base station 102 is being served. In the case of an RF-interface base station 116, the associated RF donor unit 114 receives analog downlink RF signals from the RF-interface base station 116 and, either alone or in combination with one or more other units of the DAS 100, converts the received analog downlink RF signals to the digital fronthaul interface format natively used in the DAS 100 for communicating time-domain baseband data (for example, by digitizing, digitally down-converting, and filtering the received analog downlink RF signals in order to produce digital baseband IQ data and formatting the resulting digital baseband IQ data into packets) and communicates the resulting packets of downlink transport data to the various RUs 106 in the simulcast zone of that base station 116. The RUs 106 in the simulcast zone for that base station 116 receive the downlink transport data and use it to generate and radiate downlink RF signals as described above. In the uplink, either alone or in combination with one or more other units of the DAS 100, the RF donor unit 114 generates a set of uplink base station signals from uplink transport data received by the RF donor unit 114 (and/or the other units of the DAS 100 involved in this process). The set of uplink base station signals is provided to the served base station 116. The uplink transport data is derived from the uplink RF signals received at the RUs 106 in the simulcast zone of the served base station 116 and communicated in packets.

In the case of a CPRI BBU 120, the associated CPRI digital donor unit 118 receives CPRI downlink fronthaul data from the CPRI BBU 120 and, either alone or in combination with another unit of the DAS 100, converts the received CPRI downlink fronthaul data to the digital fronthaul interface format natively used in the DAS 100 for communicating time-domain baseband data (for example, by re-sampling, synchronizing, combining, separating, gain adjusting, etc. the CPRI baseband IQ data, and formatting the resulting baseband IQ data into packets), and communicates the resulting packets of downlink transport data to the various RUs 106 in the simulcast zone of that CPRI BBU 120. The RUs 106 in the simulcast zone of that CPRI BBU 120 receive the packets of downlink transport data and use them to generate and radiate downlink RF signals as described above. In the uplink, either alone or in combination with one or more other units of the DAS 100, the CPRI donor unit 118 generates uplink base station data from uplink transport data received by the CPRI donor unit 118 (and/or the other units of the DAS 100 involved in this process). The resulting uplink base station data is provided to that CPRI BBU 120. The uplink transport data is derived from the uplink RF signals received at the RUs 106 in the simulcast zone of the CPRI BBU 120.

In the case of an O-RAN DU 124, the associated O-RAN donor unit 122 receives packets of O-RAN downlink fronthaul data (that is, O-RAN user-plane and control-plane messages) from each O-RAN DU 124 coupled to that O-RAN digital donor unit 122 and, either alone or in combination with another unit of the DAS 100, converts (if necessary) the received packets of O-RAN downlink fronthaul data to the digital fronthaul interface format natively used in the DAS 100 for communicating O-RAN baseband data and communicates the resulting packets of downlink transport data to the various RUs 106 in a simulcast zone for that ORAN DU 124. The RUs 106 in the simulcast zone of each O-RAN DU 124 receive the packets of downlink transport data and use them to generate and radiate downlink RF signals as described above. In the uplink, either alone or in combination with one or more other units of the DAS 100, the O-RAN donor unit 122 generates packets of uplink base station data from uplink transport data received by the O-RAN donor unit 122 (and/or the other units of the DAS 100 involved in this process). The resulting packets of uplink base station data are provided to the O-RAN DU 124. The uplink transport data is derived from the uplink RF signals received at the RUs 106 in the simulcast zone of the served O-RAN DU 124 and communicated in packets.

In one implementation, one of the units of the DAS 100 is also used to implement a "master" timing entity for the DAS 100 (for example, such a master timing entity can be implemented as a part of a master unit 130 described below). In another example, a separate, dedicated timing master entity (not shown) is provided within the DAS 100. In either case, the master timing entity synchronizes itself to an external timing master entity (for example, a timing master associated with one or more of the O-DUs 124) and, in turn, that entity serves as a timing master entity for the other units of the DAS 100. A time synchronization protocol (for example, the Institute of Electrical and Electronics Engineers (IEEE) 1588 Precision Time Protocol (PTP), the Network Time Protocol (NTP), or the Synchronous Ethernet (SyncE) protocol) can be used to implement such time synchronization A management system (not shown) can be used to manage the various nodes of the DAS 100. In one implementation, the management system communicates with a predetermined "master" entity for the DAS 100 (for example, the master unit 130 described below), which in turns forwards or otherwise communicates with the other units of the DAS 100 for management-plane purposes. In another implementation, the management system communicates with the various units of the DAS 100 directly for management-plane purposes (that is, without using a master entity as a gateway).

Each base station 102 (including each RF-interface base station 116, CPRI BBU 120, and O-RAN DU 124), donor unit 104 (including each RF donor unit 114, CPRI donor unit 118, and O-RAN donor unit 122), RU 106, ICN 112, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.). Such entities can be implemented in other ways.

The DAS 100 can be implemented in a virtualized manner or a non-virtualized manner. When implemented in a virtualized manner, one or more nodes, units, or functions of the DAS 100 are implemented using one or more virtual network functions (VNFs) executing on one or more physical server computers (also referred to here as "physical servers" or just "servers") (for example, one or more commercial-off-the-shelf (COTS) servers of the type that are deployed in data centers or "clouds" maintained by enterprises, communication service providers, or cloud services providers). More specifically, in the exemplary embodiment shown in FIG. 1, each O-RAN donor unit 122 is implemented as a VNF running on a server 126. The server 126 can execute other VNFs 128 that implement other functions for the DAS 100 (for example, fronthaul, management plane, and synchronization plane functions). The various VNFs executing on the server 126 are also referred to here as "master unit" functions 130 or, collectively, as the "master unit" 130. Also, in the exemplary embodiment shown in FIG. 1, each ICN 112 is implemented as a VNF running on a server 132.

The RF donor units 114 and CPRI donor units 118 can be implemented as cards (for example, Peripheral Component Interconnect (PCI) Cards) that are inserted in the server 126. Alternatively, the RF donor units 114 and CPRI donor units 118 can be implemented as separate devices that are coupled to the server 126 via dedicated Ethernet links or via a switched Ethernet network (for example, the switched Ethernet network 134 described below).

In the exemplary embodiment shown in FIG. 1, the donor units 104, RUs 106 and ICNs 112 are communicatively coupled to one another via a switched Ethernet network 134. Also, in the exemplary embodiment shown in FIG. 1, an O-RAN DU 124 can be coupled to a corresponding O-RAN donor unit 122 via the same switched Ethernet network 134 used for communication within the DAS 100 (though each O-RAN DU 124 can be coupled to a corresponding O-RAN donor unit 122 in other ways). In the exemplary embodiment shown in FIG. 1, the downlink and uplink transport data communicated between the units of the DAS 100 is formatted as O-RAN data that is communicated in Ethernet packets over the switched Ethernet network 134.

In the exemplary embodiment shown in FIG. 1, the RF donor units 114 and CPRI donor units 118 are coupled to the RUs 106 and ICNs 112 via the master unit 130.

In the downlink, the RF donor units 114 and CPRI donor units 118 provide downlink time-domain baseband IQ data to the master unit 130. The master unit 130 generates downlink O-RAN user-plane messages containing downlink baseband IQ that is either the time-domain baseband IQ data provided from the donor units 114 and 118 or is derived therefrom (for example, where the master unit 130 converts the received time-domain baseband IQ data into frequency-domain baseband IQ data). The master unit 130 also generates corresponding downlink O-RAN control-plane messages for those O-RAN user-plane messages. The resulting downlink O-RAN user-plane and control-plane messages are communicated (multicasted) to the RUs 106 in the simulcast zone of the corresponding base station 102 via the switched Ethernet network 134.

In the uplink, for each RF-interface base station 116 and CPRI BBU 120, the master unit 130 receives O-RAN uplink user-plane messages for the base station 116 or CPRI BBU 120 and performs a combining or summing process using the uplink baseband IQ data contained in those messages in order to produce combined uplink baseband IQ data, which is provided to the appropriate RF donor unit 114 or CPRI donor unit 118. The RF donor unit 114 or CPRI donor unit 118 uses the combined uplink baseband IQ data to generate a set of base station signals or CPRI data that is communicated to the corresponding RF-interface base station 116 or CPRI BBU 120. If time-domain baseband IQ data has been converted into frequency-domain baseband IQ data for transport over the DAS 100, the donor unit 114 or 118 also converts the combined uplink frequency-domain IQ data into combined uplink time-domain IQ data as part of generating the set of base station signals or CPRI data that is communicated to the corresponding RF-interface base station 116 or CPRI BBU 120.

In the exemplary embodiment shown in FIG. 1, the master unit 130 (more specifically, the O-RAN donor unit 122) receives downlink O-RAN user-plane and control-plane messages from each served O-RAN DU 124 and communicates (multicasts) them to the RUs 106 in the simulcast zone of the corresponding O-RAN DU 124 via the switched Ethernet network 134. In the uplink, the master unit 130 (more specifically, the O-RAN donor unit 122) receives O-RAN uplink user-plane messages for each served O-RAN DU 124 and performs a combining or summing process using the uplink baseband IQ data contained in those messages in order to produce combined uplink IQ data. The O-RAN donor unit 122 produces O-RAN uplink user-plane messages containing the combined uplink baseband IQ data and communicates those messages to the O-RAN DU 124.

In the exemplary embodiment shown in FIG. 1, only uplink transport data is communicated using the ICNs 112, and downlink transport data is communicated from the master unit 130 to the RUs 106 without being forwarded by, or otherwise communicated using, the ICNs 112.

Figure 2:
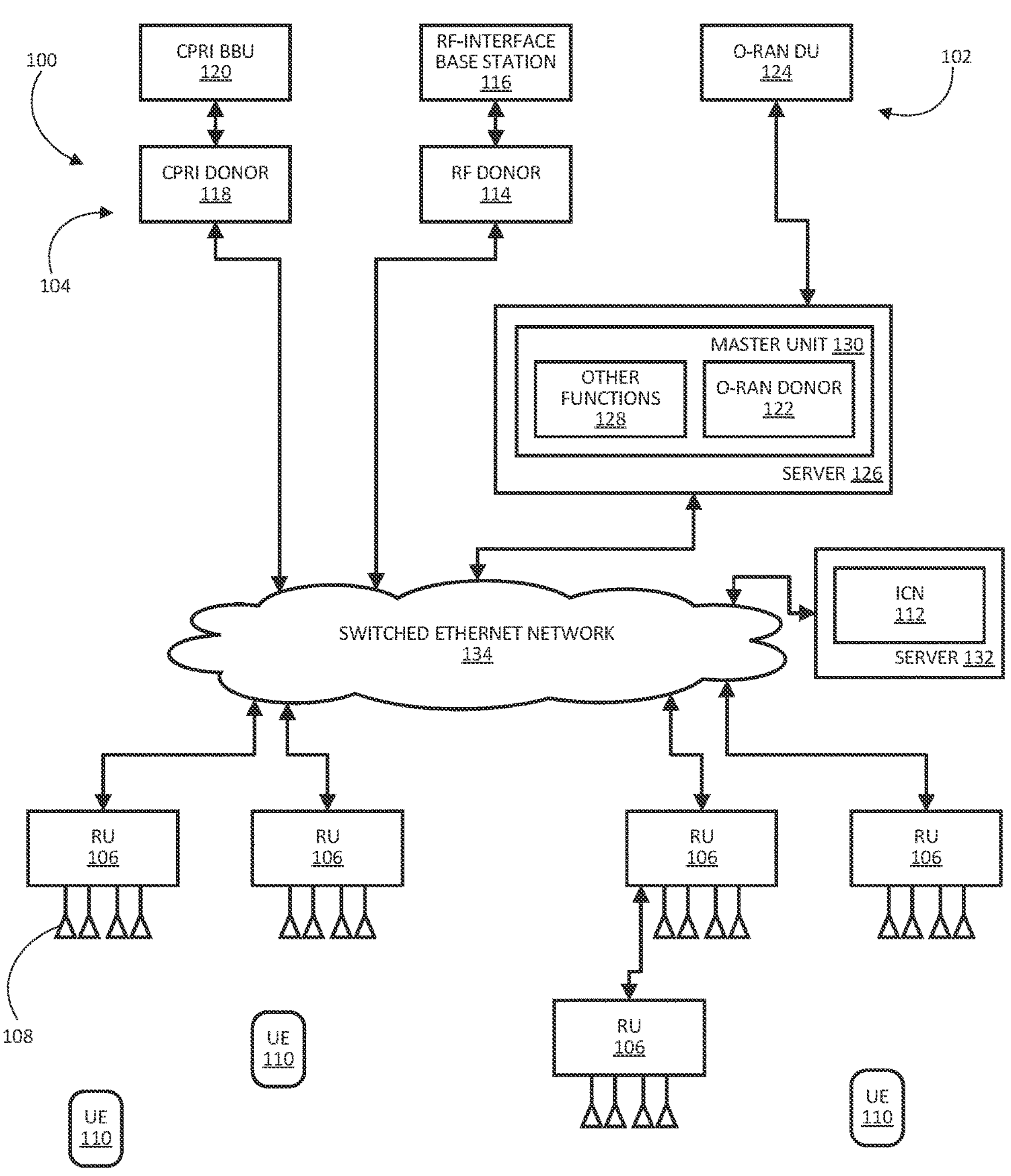

FIG. 2 illustrates another exemplary embodiment of a DAS 100. The DAS 100 shown in FIG. 2 is the same as the DAS 100 shown in FIG. 1 except as described below. In the exemplary embodiment shown in FIG. 2, the RF donor units 114 and CPRI donor units 118 are coupled directly to the switched Ethernet network 134 and not via the master unit 130, as is the case in the embodiment shown in FIG. 1.

As described above, in the exemplary embodiment shown in FIG. 1, the master unit 130 performs some transport functions related to serving the RF-interface base stations 116 and CPRI BBUs 120 coupled to the donor units 114 and 118. In the exemplary embodiment shown in FIG. 2, the RF donor units 114 and CPRI donor units 118 perform those transport functions (that is, the RF donor units 114 and CPRI donor units 118 perform all of the transport functions related to serving the RF-interface base stations 116 and CPRI BBUs 120, respectively).

Figure 3:
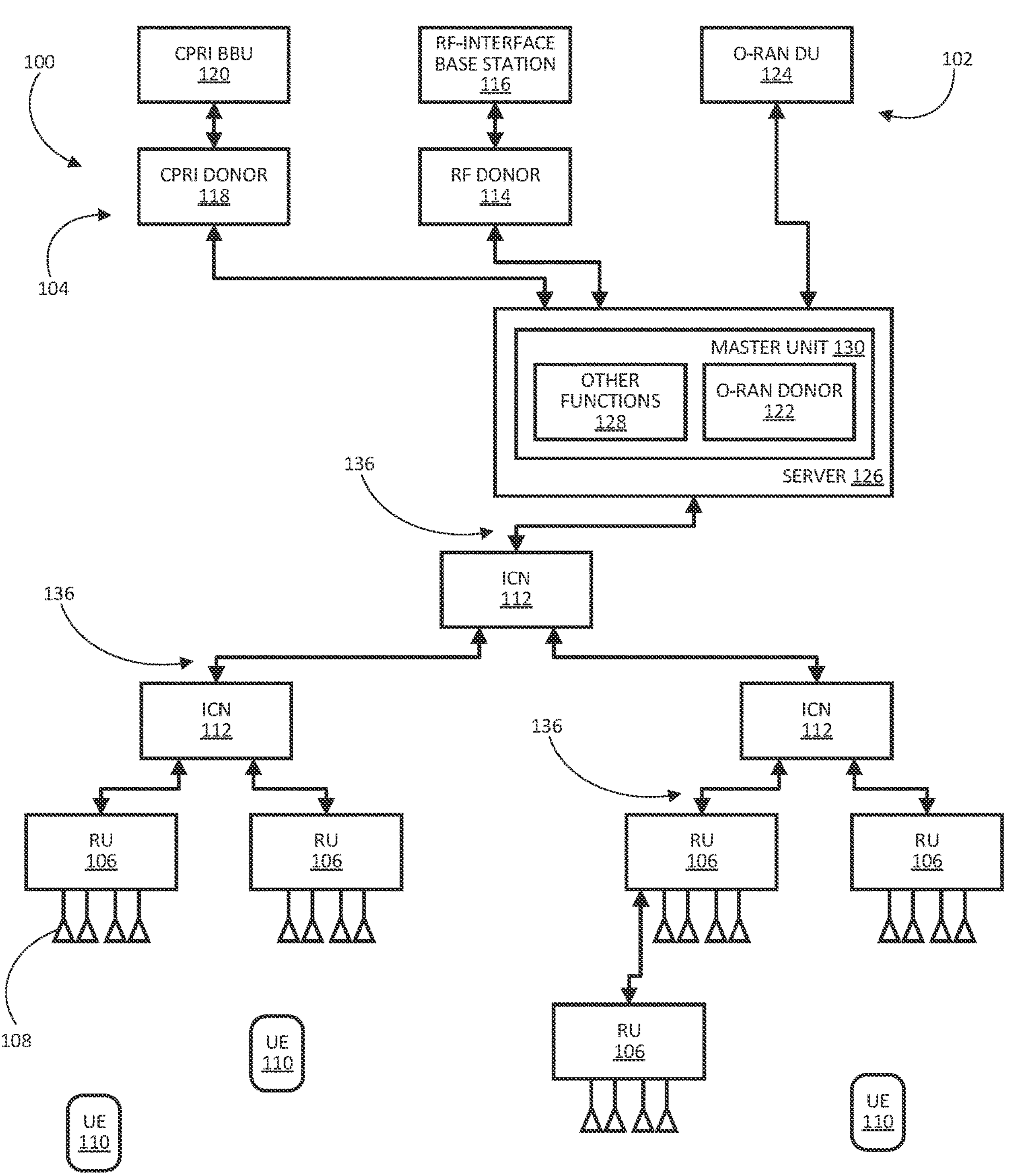

FIG. 3 illustrates another exemplary embodiment of a DAS 100. The DAS 100 shown in FIG. 3 is the same as the DAS 100 shown in FIG. 1 except as described below. In the exemplary embodiment shown in FIG. 3, the donor units 104, RUs 106 and ICNs 112 are communicatively coupled to one another via point-to-point Ethernet links 136 (instead of a switched Ethernet network). Also, in the exemplary embodiment shown in FIG. 3, an O-RAN DU 124 can be coupled to a corresponding O-RAN donor unit 122 via a switched Ethernet network (not shown in FIG. 3), though that switched Ethernet network is not used for communication within the DAS 100. In the exemplary embodiment shown in FIG. 3, the downlink and uplink transport data communicated between the units of the DAS 100 is communicated in Ethernet packets over the point-to-point Ethernet links 136.

For each southbound point-to-point Ethernet link 136 that couples a master unit 130 to an ICN 112, the master unit 130 assembles downlink transport frames and communicates them in downlink Ethernet packets to the ICN 112 over the point-to-point Ethernet link 136. For each point-to-point Ethernet link 136, each downlink transport frame multiplexes together downlink time-domain baseband IQ data and Ethernet data that needs to be communicated to southbound RUs 106 and ICNs 112 that are coupled to the master unit 130 via that point-to-point Ethernet link 136. The downlink time-domain baseband IQ data is sourced from one or more RF donor units 114 and/or CPRI donor units 118. The Ethernet data comprises downlink user-plane and control-plane O-RAN fronthaul data sourced from one or more O-RAN donor units 122 and/or management-plane data sourced from one or more management entities for the DAS 100. That is, this Ethernet data is encapsulated into downlink transport frames that are also used to communicate downlink time-domain baseband IQ data and this Ethernet data is also referred to here as "encapsulated" Ethernet data. The resulting downlink transport frames are communicated in the payload of downlink Ethernet packets communicated from the master unit 130 to the ICN 112 over the point-to-point Ethernet link 136. The Ethernet packets into which the encapsulated Ethernet data is encapsulated are also referred to here as "transport" Ethernet packets.

Each ICN 112 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. Any encapsulated Ethernet data that is intended for the ICN 112 (for example, management-plane Ethernet data) is processed by the ICN 112.

For each southbound point-to-point Ethernet link 136 coupled to the ICN 112, the ICN 112 assembles downlink transport frames and communicates them in downlink Ethernet packets to the southbound entities subtended from the ICN 112 via the point-to-point Ethernet link 136. For each southbound point-to-point Ethernet link 136, each downlink transport frame multiplexes together downlink time-domain baseband IQ data and Ethernet data received at the ICN 112 that needs to be communicated to those subtended southbound entities. The resulting downlink transport frames are communicated in the payload of downlink transport Ethernet packets communicated from the ICN 112 to those subtended southbound entities ICN 112 over the point-to-point Ethernet link 136.

Each RU 106 receives downlink transport Ethernet packets via each northbound point-to-point Ethernet link 136 and extracts any downlink time-domain baseband IQ data and/or encapsulated Ethernet data included in the downlink transport frames communicated via the received downlink transport Ethernet packets. As described above, the RU 106 uses any downlink time-domain baseband IQ data and/or downlink O-RAN user-plane and control-plane fronthaul messages to generate downlink RF signals for radiation from the set of coverage antennas 108 associated with that RU 106. The RU 106 processes any management-plane messages communicated to that RU 106 via encapsulated Ethernet data.

Also, for any southbound point-to-point Ethernet link 136 coupled to the RU 106, the RU 106 assembles downlink transport frames and communicates them in downlink Ethernet packets to the southbound entities subtended from the RU 106 via the point-to-point Ethernet link 136. For each southbound point-to-point Ethernet link 136, each downlink transport frame multiplexes together downlink time-domain baseband IQ data and Ethernet data received at the RU 106 that needs to be communicated to those subtended southbound entities. The resulting downlink transport frames are communicated in the payload of downlink transport Ethernet packets communicated from the RU 106 to those subtended southbound entities ICN 112 over the point-to-point Ethernet link 136.

In the uplink, each RU 106 generates uplink time-domain baseband IQ data and/or uplink O-RAN user-plane fronthaul messages for each RF-interface base station 116, CPRI BBU 120, and/or O-RAN DU 124 served by that RU 106 as described above. For each northbound point-to-point Ethernet link 136 of the RU 106, the RU 106 assembles uplink transport frames and communicates them in uplink transport Ethernet packets northbound towards the appropriate master unit 130 via that point-to-point Ethernet link 136. For each northbound point-to-point Ethernet link 136, each uplink transport frame multiplexes together uplink time-domain baseband IQ data originating from that RU 106 and/or any southbound entity subtended from that RU 106 as well as any Ethernet data originating from that RU 106 and/or any southbound entity subtended from that RU 106. In connection with doing this, the RU 106 performs the combining or summing process described above for any base station 102 served by that RU 106 and also by one or more of the subtended entities. (The RU 106 forwards northbound all other uplink data received from those southbound entities.) The resulting uplink transport frames are communicated in the payload of uplink transport Ethernet packets northbound towards the master unit 130 via the associated point-to-point Ethernet link 136.

Each ICN 112 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. For each northbound point-to-point Ethernet link 136 coupled to the ICN 112, the ICN 112 assembles uplink transport frames and communicates them in uplink transport Ethernet packets northbound towards the master unit 130 via that point-to-point Ethernet link 136. For each northbound point-to-point Ethernet link 136, each uplink transport frame multiplexes together uplink time-domain baseband IQ data and Ethernet data received at the ICN 112 that needs to be communicated northbound towards the master unit 130. The resulting uplink transport frames are communicated in the payload of uplink transport Ethernet packets communicated northbound towards the master unit 130 over the point-to-point Ethernet link 136.

Each master unit 130 receives uplink transport Ethernet packets via each southbound point-to-point Ethernet link 136 and extracts any uplink time-domain baseband IQ data and/or encapsulated Ethernet data included in the uplink transport frames communicated via the received uplink transport Ethernet packets. Any extracted uplink time-domain baseband IQ data, as well as any uplink O-RAN messages communicated in encapsulated Ethernet, is used in producing a single "combined" set of uplink base station signals or data for the associated base station 102 as described above (which includes performing the combining or summing process). Any other encapsulated Ethernet data (for example, management-plane Ethernet data) is forwarded on towards the respective destination (for example, a management entity).

In the exemplary embodiment shown in FIG. 3, synchronization-plane messages are communicated using native Ethernet packets (that is, non-encapsulated Ethernet packets) that are interleaved between the transport Ethernet packets.

Figure 4:
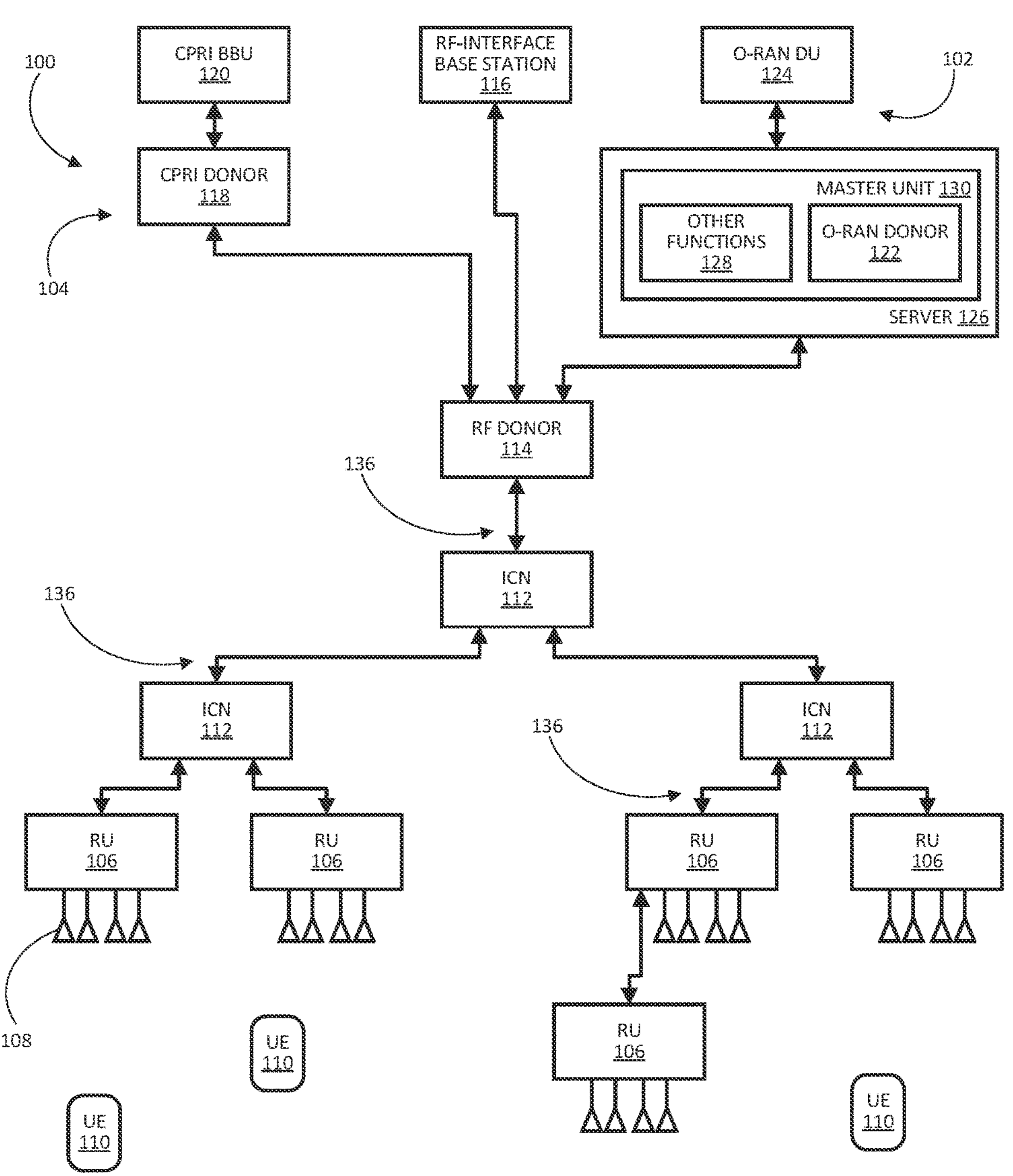

FIG. 4 illustrates another exemplary embodiment of a DAS 100. The DAS 100 shown in FIG. 4 is the same as the DAS 100 shown in FIG. 3 except as described below. In the exemplary embodiment shown in FIG. 4, the CPRI donor units 118, O-RAN donor unit 122, and master unit 130 are coupled to the RUs 106 and ICNs 112 via one or more RF units 114. That is, each RF unit 114 performs the transport frame multiplexing and demultiplexing that is described above in connection with FIG. 3 as being performed by the master unit 130.

The transport connectivity validating and monitoring techniques described above can also be implemented in a base station or RAN such as the various ones described below.

Figure 5:
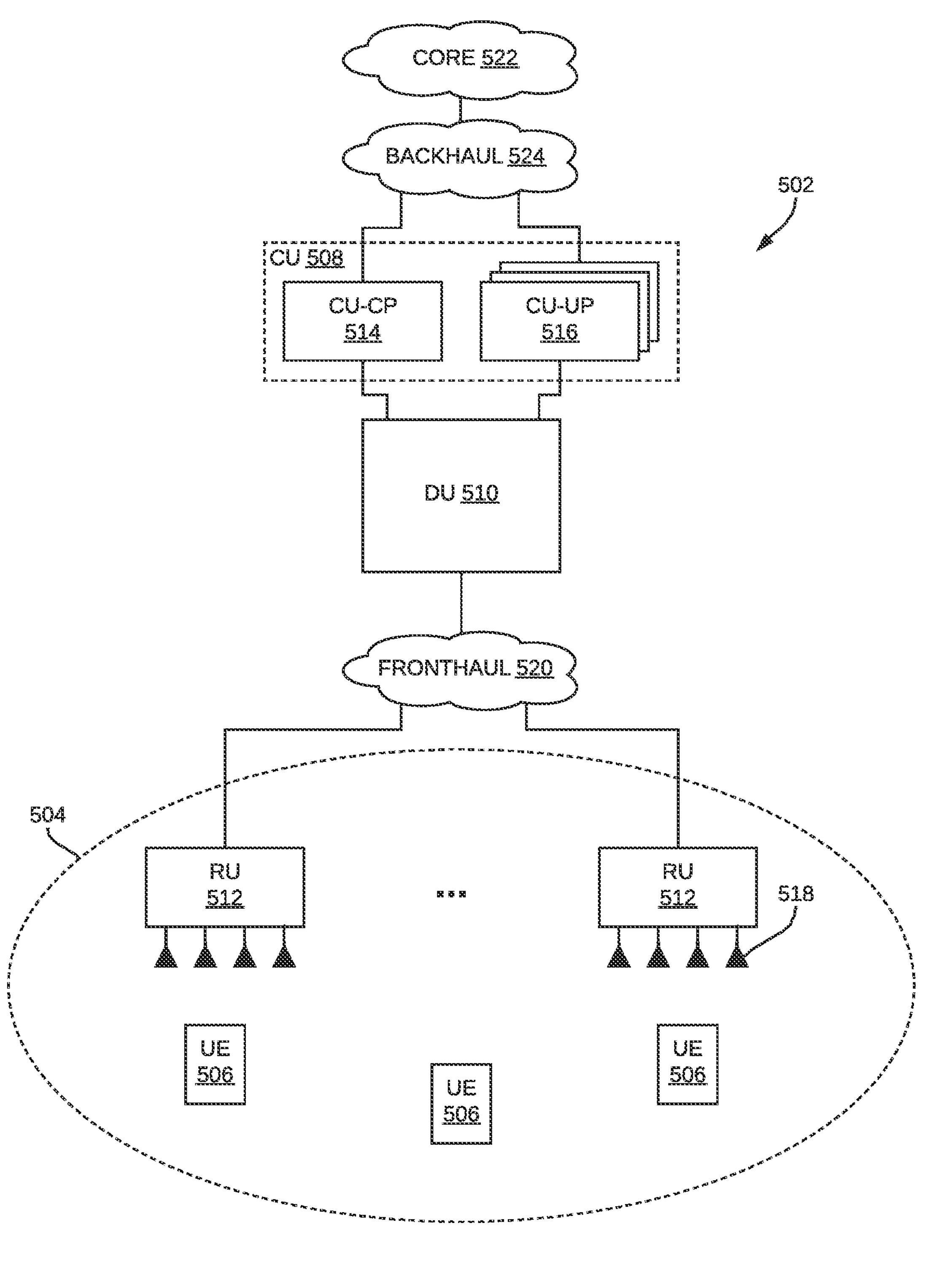
FIG. 5 is a block diagram illustrating one exemplary embodiment of a radio access network (RAN) system.

FIG. 5 is a block diagram illustrating one exemplary embodiment of a radio access network (RAN) system 500 in which the slot-by-slot power saving techniques described above can be used.

The system 500 shown in FIG. 5 implements at least one base station entity 502 to serve a cell 504. Each such base station entity 502 can also be referred to here as a "base station" or "base station system" (and, which in the context of a fourth generation (4G) Long Term Evolution (LTE) system, may also be referred to as an "evolved NodeB", "eNodeB", or "eNB" and, in the context of a fifth generation (5G) New Radio (NR) system, may also be referred to as a "gNodeB" or "gNB").

In general, each base station 502 is configured to provide wireless service to various items of user equipment (UEs) 506 served by the associated cell 504. Unless explicitly stated to the contrary, references to Layer 1, Layer 2, Layer 3, and other or equivalent layers (such as the Physical Layer or the Media Access Control (MAC) Layer) refer to layers of the particular wireless interface (for example, 4G LTE or 5G NR) used for wirelessly communicating with UEs 506. Furthermore, it is also to be understood that 5G NR embodiments can be used in both standalone and non-standalone modes (or other modes developed in the future) and the following description is not intended to be limited to any particular mode. Moreover, although some embodiments are described here as being implemented for use with 5G NR, other embodiments can be implemented for use with other wireless interfaces and the following description is not intended to be limited to any particular wireless interface.

In the specific exemplary embodiment shown in FIG. 5, each base station 502 is implemented as a respective 5G NR gNB 502 (only one of which is shown in FIG. 5 for ease of illustration). In this embodiment, each gNB 502 is partitioned into one or more central unit entities (CUs) 508, one or more distributed unit entities (DUs) 510, and one or more radio units (RUs) 51*w*2. In such a configuration, each CU 508 implements Layer 3 and non-time critical Layer 2 functions for the gNB 502. In the embodiment shown in FIG. 5, each CU 508 is further partitioned into one or more control-plane entities 514 and one or more user-plane entities 516 that handle the control-plane and user-plane processing of the CU 508, respectively. Each such control-plane CU entity 514 is also referred to as a "CU-CP" 514, and each such user-plane CU entity 516 is also referred to as a "CU-UP" 516. Also, in such a configuration, each DU 510 is configured to implement the time critical Layer 2 functions and, except as described below, at least some of the Layer 1 functions for the gNB 502. In this example, each RU 512 is configured to implement the physical layer functions for the gNB 502 that are not implemented in the DU 510 as well as the RF interface. Also, each RU 512 includes or is coupled to a respective set of one or more antennas 518 via which downlink RF signals are radiated to UEs 506 and via which uplink RF signals transmitted by UEs 506 are received.

In one implementation (shown in FIG. 5), each RU 512 is remotely located from each DU 510 serving it. Also, in such an implementation, at least one of the RUs 512 is remotely located from at least one other RU 512 serving the associated cell 504. In another implementation, at least some of the RUs 512 are co-located with each other, where the respective sets of antennas 518 associated with the RUs 512 are directed to transmit and receive signals from different areas. Moreover, in the implementation shown in FIG. 5, the gNB 502 includes multiple RUs 512 to serve a single cell 504; however, it is to be understood that gNB 502 can include only a single RU 512 to serve a cell 504.

Each RU 512 is communicatively coupled to the DU 510 serving it via a fronthaul network 520. The fronthaul network 520 can be implemented using a switched Ethernet network, in which case each RU 512 and each physical node on which each DU 510 is implemented includes one or more Ethernet network interfaces to couple each RU 512 and each DU physical node to the fronthaul network 520 in order to facilitate communications between the DU 510 and the RUs 512. In one implementation, the fronthaul interface promulgated by the O-RAN Alliance is used for communication between the DU 510 and the RUs 512 over the fronthaul network 520. In another implementation, a proprietary fronthaul interface that uses a so-called "functional split 7-2" for at least some of the physical channels (for example, for the PDSCH and PUSCH) and a different functional split for at least some of the other physical channels (for example, using a functional split 6 for the PRACH and SRS).

In such an example, each CU 508 is configured to communicate with a core network 522 of the associated wireless operator using an appropriate backhaul network 524 (typically, a public wide area network such as the Internet).

Although FIG. 5 (and the description set forth below more generally) is described in the context of a 5G embodiment in which each logical base station entity 502 is partitioned into a CU 508, DUs 510, and RUs 512 and, for at least some of the physical channels, some physical-layer processing is performed in the DUs 510 with the remaining physical-layer processing being performed in the RUs 512, it is to be understood that the techniques described here can be used with other wireless interfaces (for example, 4G LTE) and with other ways of implementing a base station entity (for example, using a conventional baseband band unit (BBU)/remote radio head (RRH) architecture). Accordingly, references to a CU, DU, or RU in this description and associated figures can also be considered to refer more generally to any entity (including, for example, any "base station" or "RAN" entity) implementing any of the functions or features described here as being implemented by a CU, DU, or RU.

Each CU 508, DU 510, and RU 512, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Moreover, each CU 508, DU 510, and RU 512, can be implemented as a physical network function (PNF) (for example, using dedicated physical programmable devices and other circuitry) and/or a virtual network function (VNF) (for example, using one or more general purpose servers (possibly with hardware acceleration) in a scalable cloud environment and in different locations within an operator's network (for example, in the operator's "edge cloud" or "central cloud"). Each VNF can be implemented using hardware virtualization, operating system virtualization (also referred to as containerization), and application virtualization as well as various combinations of two or more the preceding. Where containerization is used to implement a VNF, it may also be referred to as a "containerized network function" (CNF).

For example, in the exemplary embodiment shown in FIG. 5, each RU 512 is implemented as a PNF and is deployed in or near a physical location where radio coverage is to be provided and each CU 508 and DU 510 is implemented using a respective set of one or more VNFs deployed in a distributed manner within one or more clouds (for example, within an "edge" cloud or "central" cloud).

Each CU 508, DU 510, and RU 512, and any of the specific features described here as being implemented thereby, can be implemented in other ways.

Figure 6A:
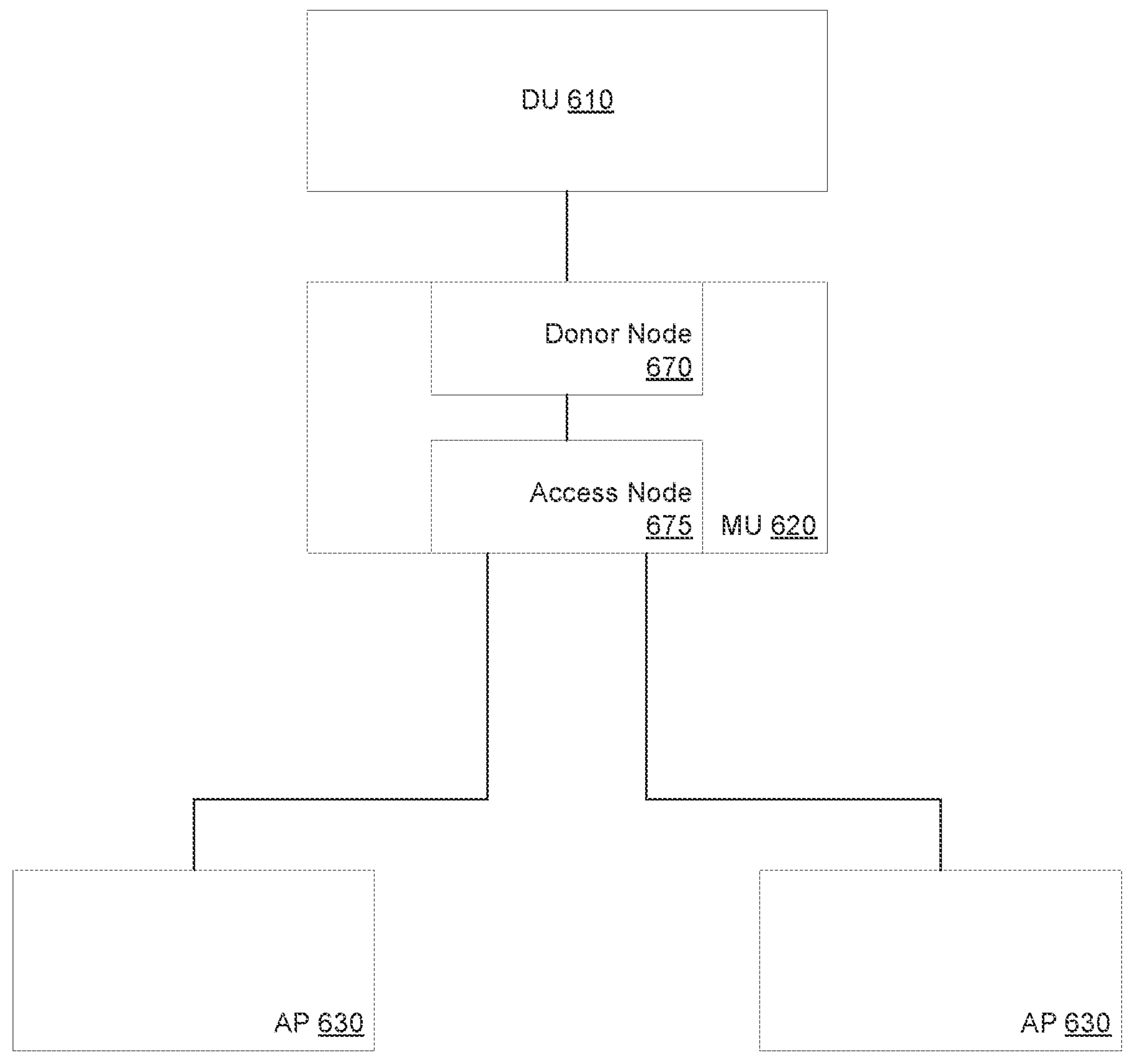
FIGS. 6A-6C are block diagrams illustrating exemplary embodiments of one or more entities of a DAS or base station.
Figure 6B:
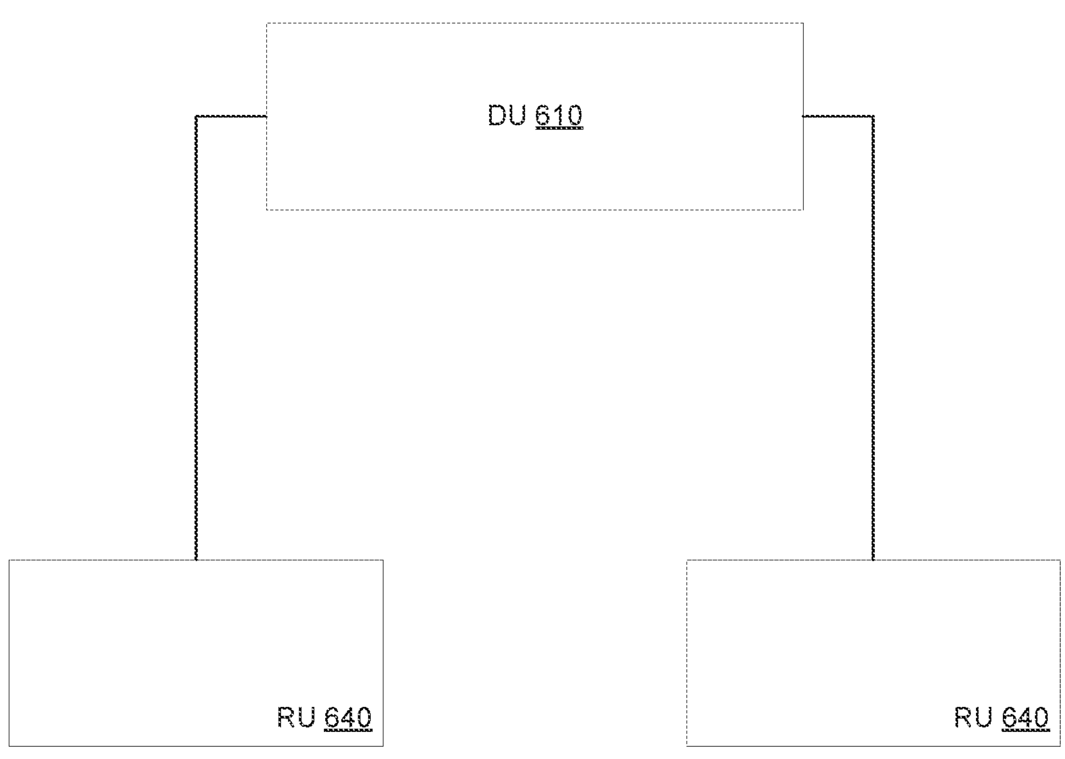
Figure 6C:
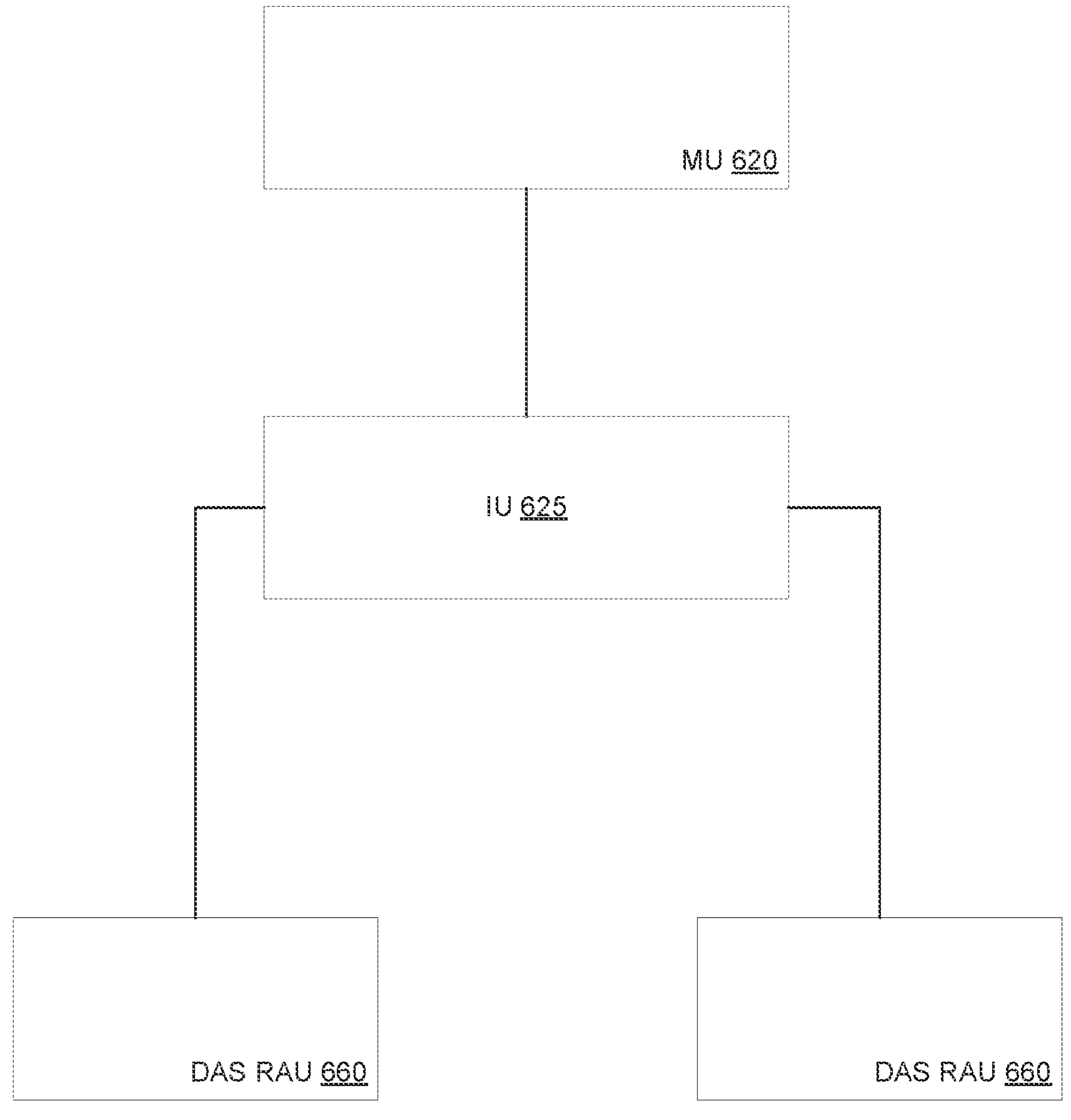

FIGS. 6A-6C are block diagrams illustrating exemplary embodiments of one or more entities of a DAS or base station, which may include the entities described in conjunction with FIGS. 1-5. FIG. 6A depicts one embodiment of a DAS architecture similar to the vDAS systems described in FIGS. 1-4. FIG. 6B depicts an exemplary base station architecture comprising a DU 610 communicatively coupled to one or more RUs 640 distributed in one or more coverage zones. FIG. 6C depicts one example of a physical DAS architecture. In FIGS. 6A-6B, the distributed unit (DU) 610 can be implemented as the DU 510 of FIG. 5, the master unit (MU) 620 (comprising donor node 670 and access node 675) can be implemented as the vMU 130 of FIGS. 1-4, and access points (AP) 630 or RU 640 can be implemented as the RU 106 or RU 512 of FIGS. 1-5. However, at least in the implementation shown in FIG. 6C, the MU 620 and DAS remote antenna units (RAUs) 660 can be implemented as conventional analog or digital nodes in the DAS. Additionally, the DAS RAUs 660 can be communicatively coupled to the MU 620 through an intermediate unit (IU) 625, which can be implemented as a conventional intermediate unit or via the ICN 112 of FIGS. 1-4. Although not explicitly shown in FIGS. 6A-6C, the DAS or base station can include any number of DU 610, MU 620, AP 630, RU 640, or DAS RAU 660. The architectures illustrated in FIGS. 6A-6C are non-exhaustive and non-exclusive and can be combined depending on the implementation.

Figure 7:
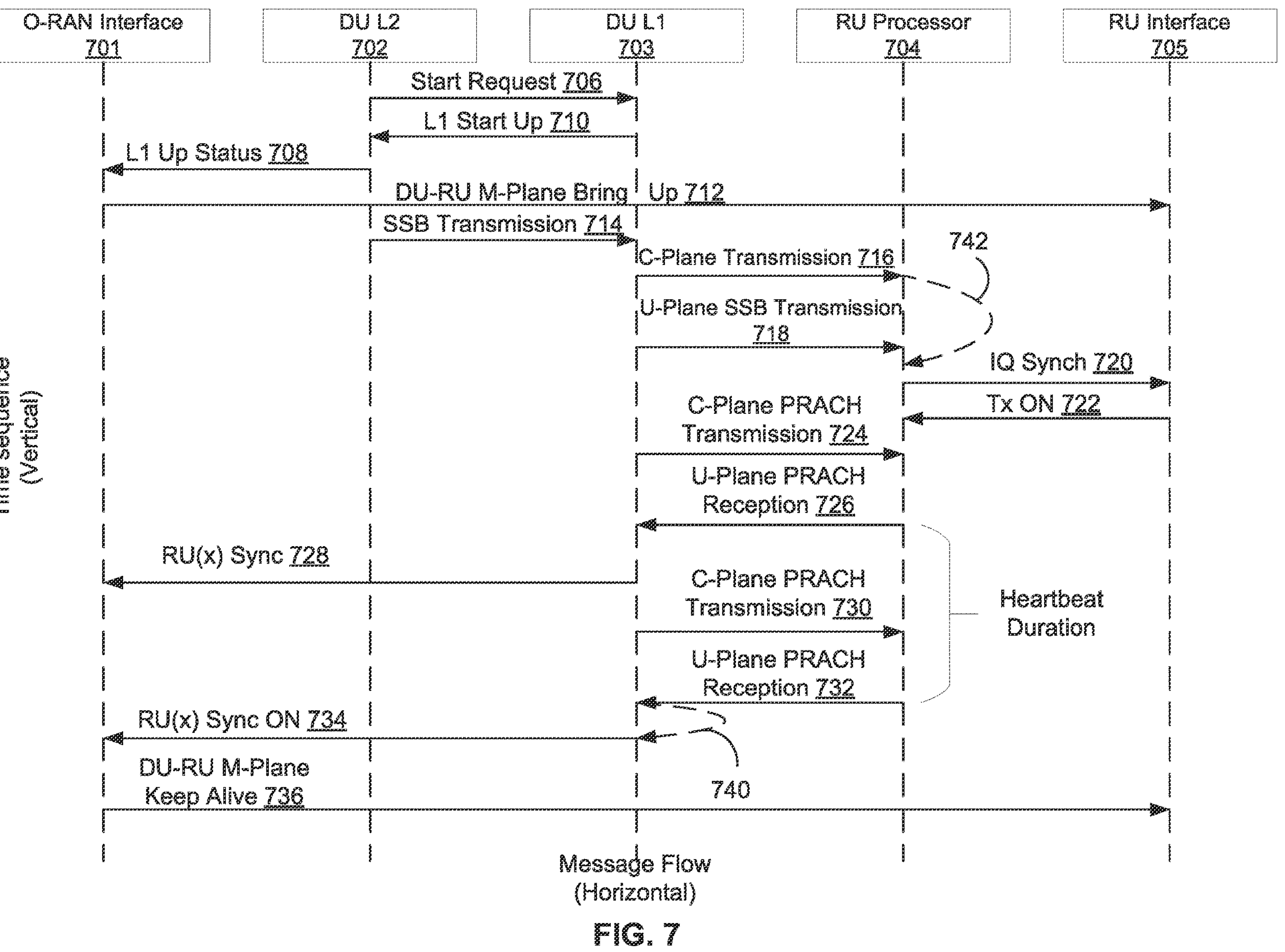
FIG. 7 is a diagram showing exemplary messages communicated between a DU and an RU.

FIG. 7 is a diagram showing exemplary messages communicated between a DU and an RU. FIG. 7 illustrates one exemplary embodiment in which connectivity information conventionally sent on specialized connectivity communication protocols such as LBM messages are incorporated into control-plane and user-plane messages communicated over non-LBM protocols. That is, the connectivity information is embedded into the control-plane and user-plane messages transmitted over other protocols between different entities in the DAS.

Messages are generally indicated as horizontal arrows between one entity such as the DU and another entity such as an RU. The horizontal axis in FIG. 7 is representative of message flow between the different entities, in which messages transmitted towards the entities of the RU are indicative of downlink messages and messages transmitted towards the entities of the DU from the RU are indicative of uplink messages. In similar fashion, the vertical axis represents the time sequence between message communication between the entities. For example, messages transmitted earlier in time are illustrated as being higher relative to another message and messages transmitted later in time are illustrated as being lower relative to another message, with the last message (the DU-RU M-plane keep alive message 736) transmitted at the bottom of FIG. 7. Although FIG. 7 illustrates a messaging sequence diagram in the context of an O-RAN, other RAN or DAS architectures can be used.

At the beginning of the message sequence, the layer 2 entity 702 of the DU sends a start up request message 706 to layer 1 entity 703 of the DU. The DU layer 1 entity 703 responds by sending an L1 start up message 710 back to the DU layer 2 entity 702 that informs the DU layer 2 entity 702 that the DU layer 1 entity 703 has initialized. The DU layer 2 entity 702 then sends an L1 up status message 708 to the O-RAN interface 701 updating the status of the DU L1 entity 703. At this stage the DU is active and ready to receive, and undergo layer 1 and layer 2 processing of, downlink control-plane and user-plane messages.

The O-RAN interface 701 transmits a bring up message 712 on the management plane (M-plane) to the DU layer 2 entity 702, DU layer 1 entity 703, RU processor 704, and RU interface 705. Then, DU layer 2 entity 702 sends a downlink SSB transmission message 714 to the DU layer 1 entity 703 including the control-plane and user-plane data. The DU then communicates the control-plane and user-plane data to the RU processor 704 via control-plane (C-plane) transmission message 716 and user-plane (U-plane) transmission message 718, respectively. At or near this stage of message flow, a conventional RAN would send a separate LBM message to each of the RUs coupled downstream of the DU to verify the connectivity of the RUs. Doing so would require each of the RUs to respond by sending another message back to the DU (and/or to other entities) with the connectivity status of the respective RU, which would introduce additional processing and signal activity for each signal path between a DU and a coupled RU.

In the embodiment shown in FIG. 7, however, the DU layer 1 entity 703 does not send separate LBM messages to the connected RUs to determine connectivity information. Instead, the DU layer 1 entity 703 treats the control-plane transmission 716 and the user-plane transmission 718 messages as messages requesting connectivity information of the respective RU receiving the messages. In one embodiment, the control-plane transmission 716 and/or user-plane transmission 718 message are modified to include a request for connectivity information to the recipient RU. The downlink or uplink user-plane or control-plane messages can be modified in other ways to indicate to the receiving unit to provide its connectivity information. Accordingly, the DU does not need to send a separate LBM message because the connectivity information content in a LBM is already included in the SSB control-plane and user-plane messages.

When the RU processor 704 receives the control-plane transmission message 716 and the user-plane transmission message 718, the RU entity treats the messages as both an SSB message to transmit the control-plane and user-plane data as well as an LBM message to report on its connectivity. Normally, the RU would send a separate LBM response message providing the connectivity information back to the DU. In the embodiment of FIG. 7, however, the RU does not immediately report on its connectivity, and instead will report its connectivity information in the next uplink control-plane or user-plane message. Once the RU processor 704 receives the control-plane and user-plane data, it performs an IQ synchronization process 742 to synchronize the IQ data streams between the RU processor 704 and the RU interface 705. As shown in FIG. 7, the RU processor 704 sends an IQ synchronization message 720 to the RU interface 705; and, in response, RU interface 705 sends a Tx ON message 722 back to the RU processor 704 indicating that it is ready to transmit user-plane data to the user equipment.

Because the control-plane and/or user-plane SSB messages indicate to the RU to provide connectivity information back to the DU, in one embodiment the RU reports its connectivity status in the next uplink control-plane and/or user-plane message, such as via a PRACH messaging protocol. In FIG. 7, DU layer 1 703 sends a control-plane PRACH transmission message 724 to RU processor 704 with the control-plane PRACH data. RU processor 704 responds by sending a user-plane PRACH reception 726 corresponding to the user-plane data received from the user equipment associated with the RU back to the DU layer 1 entity 703. In response to receiving the uplink user-plane PRACH data, DU layer 1 entity 703 sends an RU(x) synchronization message 728 back to the O-RAN interface 701 that indicates that the synchronization status for a particular RU(x) of a set of RUs in a simulcast zone. The DU layer 1 703 and the RU processor 704 may periodically exchange a repeated number of C-plane PRACH transmission 730 and U-plane PRACH reception 732 messages as a heartbeat mechanism for keeping the DU layer 1 entity 703 and the RU processor 704 in an active status during PRACH transmissions.

After a certain number of heartbeat messages are exchanged, the PRACH header 740 is validated in the next synchronization message 734 sent to the O-RAN interface 701, which includes the synchronization status of the particular radio unit RU(x) associated with the RU processor 704 and RU interface 705 in FIG. 7. The messaging sequence finally shows a DU-RU keep alive message 736 transmitted by the O-RAN interface 701 in the M-plane to keep the downstream DU and RU entities active for further downlink and uplink message transmissions. Additional user-plane and control-plane messages in the downlink and uplink may be sent between the DU and RU entities, as previously described.

While incorporating connectivity information is explicitly shown in the context of SSB message (in the downlink) and PRACH messages (in the uplink), other standard non-LBM data communication messaging protocols can be used. For example, any message protocols that supports standard data communication between the entities of the RAN or DAS can be used (including any message protocols that the RAN or DAS would already use as part of communicating data signals between its entities). In some embodiments, connectivity information can be incorporated into periodic downlink or uplink messaging protocols, which are sent during frequent or periodic intervals in the RAN or DAS. This way the connectivity information for each of the RUs can be periodically updated without having to send additional LBM messages between the different entities.

Figure 8:
FIG. 8 is a flow diagram illustrating a method for monitoring transport connectivity information between entities of a radio access network (RAN) or distributed antenna system (DAS).
Figure 8:
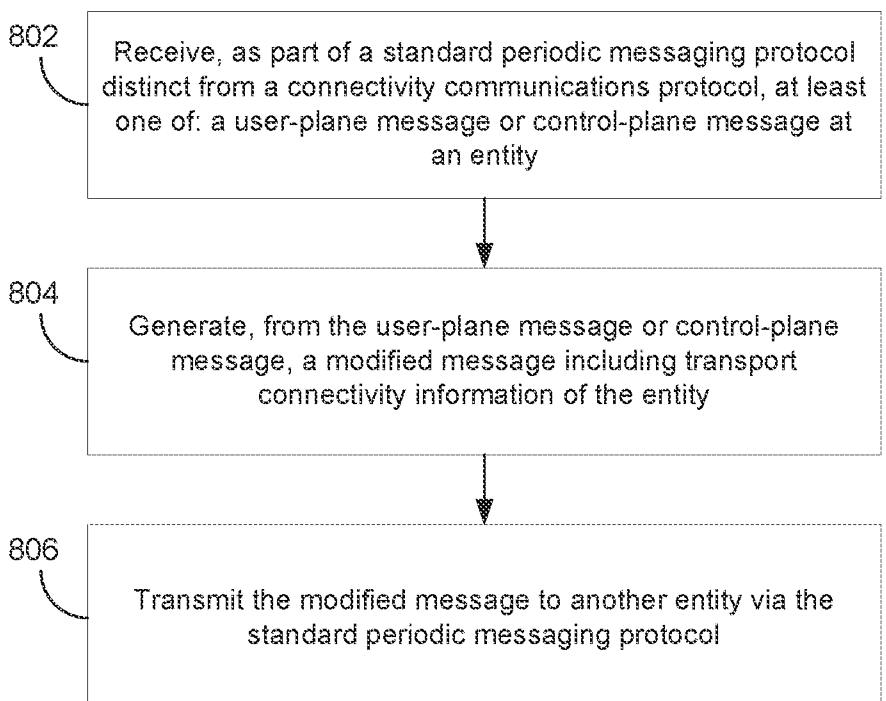

FIG. 8 is a flow diagram illustrating a method for monitoring transport connectivity information between entities of a radio access network (RAN) or distributed antenna system (DAS). The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). Also, most standard exception handling is not described for ease of explanation;

however, it is to be understood that method 800 can and typically would include such exception handling.

Method 800 includes receiving, as part of a standard periodic messaging protocol, at least one of: a user-plane message or control-plane message at an entity of a distributed antenna system or radio access network at block 802. The standard periodic messaging protocol is distinct from a connectivity communications protocol that would normally be used by the DAS or RAN to determine the connectivity of one or more entities of the DAS or RAN. Referring to FIG. 7, the connectivity communications protocol can be a loop-back messaging protocol between entities of an O-RAN, and the standard periodic messaging protocol can be the SSB or PRACH message protocols used to exchange the downlink or uplink C-plane or U-plane data between the entities of the O-RAN.

Method 800 proceeds to block 804 to generate, from the user-plane message or control-plane message, a modified message including transport connectivity information of the entity that received the user-plane message or control-plane message. For example, when an RU receives an SSB message from a DU entity, the RU will be configured to determine its connectivity information in response to receiving the SSB message. In some implementations, the SSB message or other periodic message may include a request for connectivity information of the recipient unit. Alternatively, the recipient unit can be configured to interpret a standard SSB message as an SSB+LBM message. The RU or other recipient unit can then send its connectivity information to the entity that sent the downlink SSB message at the next uplink user-plane or control-plane message. Referring to FIG. 7, in one implementation, when the RU receives user-plane uplink data from its associated user equipment via a PRACH message, the RU generates a standard uplink PRACH message and embeds its connectivity information in the PRACH message.

Method 800 then proceeds to block 806 and transmits the modified message to another entity in the DAS or RAN via a standard periodic messaging protocol distinct from a connectivity communications protocol such as LBM. In FIG. 7, the RU sends an uplink PRACH message to the DU entity that includes both the user-plane data and the connectivity information of the RU. In some implementations, such as that shown in FIG. 7, the standard periodic messaging protocol used to send the connectivity information is distinct from the standard periodic messaging protocol used to trigger the recipient unit to determine its connectivity information. That is, different protocols used to transmit user-plane and control-plane data can be used to transport connectivity information. In FIG. 7, the RU is initially triggered to report its connectivity information from an SSB message received from the DU entity, but in response, the RU transmits a PRACH message that includes its connectivity information to the DU entity. In doing so, the connectivity information between entities of the DAS or RAN can be exchanged quickly without the additional processing overhead required to send additional LBM messages to each RU coupled to the DU entity.

The methods and techniques described herein may be implemented in digital electronic circuitry, or with a programmable processor (for example, a special-purpose processor or a general-purpose processor such as a computer), firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electronically erasable programmable read-only memory (EEPROM), and flash memory devices; magnetic disks such as internal hard disks and removable disks; magneto-optical disks; and digital video disks (DVSs). Any of the foregoing may be supplemented by, or incorporated in, specially-designed application-specific integrated circuits (ASICs).

EXAMPLE EMBODIMENTS

Example 1 includes a radio access network (RAN) comprising: a distributed unit (DU); and one or more radio units (RUS) coupled to the DU over a fronthaul network; wherein the RAN is configured to verify and monitor transport connectivity between the DU and at least one RU using at least one of control-plane or user-plane messages communicated over the fronthaul network for a purpose other than verifying or monitoring the transport connectivity between the DU and said at least one RU.

Example 2 includes the RAN of Example 1, wherein the RAN is configured to verify and monitor the transport connectivity between the DU and at least one RU using at least one of control-plane or user-plane messages communicated over the fronthaul network in connection with over-the-air (OTA) wireless communication related to one or more of a Synchronization Signal Block (SSB), a Master Information Block (MIB), and a Physical Random Access Channel (PRACH).

Example 3 includes the RAN of any of Examples 1-2, wherein an O-RAN fronthaul interface is used for communicating the user-plane and control-plane messages over the fronthaul network.

Example 4 includes the RAN of any of Examples 1-3, wherein using at least one of control-plane or user-plane messages communicated over the fronthaul network for a purpose other than verifying or monitoring the transport connectivity comprises receiving the user-plane or control-plane messages via a standard periodic messaging protocol distinct from a connectivity communications protocol.

Example 5 includes the RAN of Example 4, wherein the standard periodic messaging protocol comprises a synchronization signal block (SSB) protocol, a master information block (MIB) protocol, and a physical random access channel (PRACH) protocol.

Example 6 includes the RAN of any of Examples 4-5, wherein the connectivity communications protocol comprises a loop back messaging (LBM) protocol.

Example 7 includes the RAN of any of Examples 4-6, wherein the DU or the one or more RUs are configured to update a packet header of a standard periodic messaging protocol message with connectivity information about the DU or the one or more RUs, and wherein the DU or the one or more RUs are configured to transmit the updated message via the standard messaging protocol.

Example 8 includes the RAN of any of Examples 4-7, wherein the at least one RU is configured to transmit the transport connectivity of the at least one RU in a following uplink control-plane or user-plane message after the at least one RU receives a downlink control-plane or user-plane message.

Example 9 includes the RAN of any of Examples 1-8, wherein to verify and monitor the transport connectivity between the DU and at least one RU using at least one of control-plane or user-plane messages communicated over the fronthaul network for a purpose other than verifying or monitoring the transport connectivity comprises receiving or sending the control-plane or the user-plane messages using a messaging protocol other than a loop back messaging (LBM) protocol.

Example 10 includes the RAN of any of Examples 1-9, wherein the at least one RU is configured to determine transport connectivity information of the at least one RU in response to receiving the at least one of control-plane or user-plane messages.

Example 11 includes a distributed antenna system (DAS) configured to serve a base station, the DAS comprising: a master unit; and a plurality of access points coupled to the master unit over a fronthaul network; wherein the DAS is configured to verify and monitor transport connectivity between the master unit and at least one access point using at least one of control-plane or user-plane messages communicated over the fronthaul network for a purpose other than verifying or monitoring the transport connectivity between the master unit and said at least one access point.

Example 12 includes the DAS of Example 11, wherein the DAS is configured to verify and monitor the transport connectivity between the master unit and said at least one access point using at least one of control-plane or user-plane messages communicated over the fronthaul network in connection with over-the-air (OTA) wireless communication related to one or more of a Synchronization Signal Block (SSB), a Master Information Block (MIB), and a Physical Random Access Channel (PRACH).

Example 13 includes the DAS of any of Examples 11-12, wherein an O-RAN fronthaul interface is used for communicating the user-plane and control-plane messages over the fronthaul network.

Example 14 includes the DAS of any of Examples 11-13, wherein using at least one of control-plane or user-plane messages communicated over the fronthaul network for a purpose other than verifying or monitoring the transport connectivity comprises receiving the user-plane or control-plane messages via a standard messaging protocol distinct from a connectivity communications protocol.

Example 15 includes the DAS of Example 14, wherein the standard messaging protocol comprises a synchronization signal block (SSB) protocol, a master information block (MIB) protocol, or a physical random access channel (PRACH) protocol.

Example 16 includes the DAS of Example 15, wherein the connectivity communications protocol comprises a loop back messaging (LBM) protocol.

Example 17 includes the DAS of any of Examples 11-16, wherein the master unit or the plurality of access points are configured to update a packet header of a standard messaging protocol message with connectivity information about the master unit or the plurality of access points, and wherein the master unit or the plurality of access points are configured to transmit the updated message via the standard messaging protocol.

Example 18 includes a method for monitoring transport connectivity information between entities of a radio access network (RAN) or distributed antenna system (DAS), comprising: receiving, as part of a first standard messaging protocol distinct from a connectivity communications protocol, at least one of a user-plane message or control-plane message at an entity of the RAN or DAS; generating, from the user-plane message or control-plane message, a modified message including transport connectivity information of the entity; and transmitting the modified message to another entity of the RAN or DAS via a second standard messaging protocol.

Example 19 includes the method of Example 18, wherein the first and second standard messaging protocol comprises a synchronization signal block (SSB) protocol, a master information block (MIB) protocol, or a physical random access channel (PRACH) protocol.

Example 20 includes the method of any of Examples 18-19, wherein the connectivity communications protocol comprises a loop back messaging (LBM) protocol.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A radio access network (RAN) comprising:

a distributed unit (DU); and one or more radio units (RUs) coupled to the DU over a fronthaul network;

wherein the RAN is configured to verify and monitor transport connectivity between the DU and at least one RU using at least one of control-plane or user-plane messages communicated over the fronthaul network for a purpose other than verifying or monitoring the transport connectivity between the DU and said at least one RU.

2. The RAN of claim 1, wherein the RAN is configured to verify and monitor the transport connectivity between the DU and at least one RU using at least one of control-plane or user-plane messages communicated over the fronthaul network in connection with over-the-air (OTA) wireless communication related to one or more of a Synchronization Signal Block (SSB), a Master Information Block (MIB), and a Physical Random Access Channel (PRACH).

3. The RAN of claim 1, wherein an O-RAN fronthaul interface is used for communicating the user-plane and control-plane messages over the fronthaul network.

4. The RAN of claim 1, wherein using at least one of control-plane or user-plane messages communicated over the fronthaul network for a purpose other than verifying or monitoring the transport connectivity comprises receiving the user-plane or control-plane messages via a standard periodic messaging protocol distinct from a connectivity communications protocol.

5. The RAN of claim 4, wherein the standard periodic messaging protocol comprises a synchronization signal block (SSB) protocol, a master information block (MIB) protocol, and a physical random access channel (PRACH) protocol.

6. The RAN of claim 4, wherein the connectivity communications protocol comprises a loop back messaging (LBM) protocol.

7. The RAN of claim 4, wherein the DU or the one or more RUs are configured to update a packet header of a standard periodic messaging protocol message with connectivity information about the DU or the one or more RUs, and wherein the DU or the one or more RUs are configured to transmit the updated message via the standard messaging protocol.

8. The RAN of claim 4, wherein the at least one RU is configured to transmit the transport connectivity of the at least one RU in a following uplink control-plane or user-plane message after the at least one RU receives a downlink control-plane or user-plane message.

9. The RAN of claim 1, wherein to verify and monitor the transport connectivity between the DU and at least one RU using at least one of control-plane or user-plane messages communicated over the fronthaul network for a purpose other than verifying or monitoring the transport connectivity comprises receiving or sending the control-plane or the user-plane messages using a messaging protocol other than a loop back messaging (LBM) protocol.

10. The RAN of claim 1, wherein the at least one RU is configured to determine transport connectivity information of the at least one RU in response to receiving the at least one of control-plane or user-plane messages.

11. A distributed antenna system (DAS) configured to serve a base station, the DAS comprising:

a master unit; and a plurality of access points coupled to the master unit over a fronthaul network;

wherein the DAS is configured to verify and monitor transport connectivity between the master unit and at least one access point using at least one of control-plane or user-plane messages communicated over the fronthaul network for a purpose other than verifying or monitoring the transport connectivity between the master unit and said at least one access point.

12. The DAS of claim 11, wherein the DAS is configured to verify and monitor the transport connectivity between the master unit and said at least one access point using at least one of control-plane or user-plane messages communicated over the fronthaul network in connection with over-the-air (OTA) wireless communication related to one or more of a Synchronization Signal Block (SSB), a Master Information Block (MIB), and a Physical Random Access Channel (PRACH).

13. The DAS of claim 11, wherein an O-RAN fronthaul interface is used for communicating the user-plane and control-plane messages over the fronthaul network.

14. The DAS of claim 11, wherein using at least one of control-plane or user-plane messages communicated over the fronthaul network for a purpose other than verifying or monitoring the transport connectivity comprises receiving the user-plane or control-plane messages via a standard messaging protocol distinct from a connectivity communications protocol.

15. The DAS of claim 14, wherein the standard messaging protocol comprises a synchronization signal block (SSB) protocol, a master information block (MIB) protocol, or a physical random access channel (PRACH) protocol.

16. The DAS of claim 15, wherein the connectivity communications protocol comprises a loop back messaging (LBM) protocol.

17. The DAS of claim 11, wherein the master unit or the plurality of access points are configured to update a packet header of a standard messaging protocol message with connectivity information about the master unit or the plurality of access points, and wherein the master unit or the plurality of access points are configured to transmit the updated message via the standard messaging protocol.

18. A method for monitoring transport connectivity information between entities of a radio access network (RAN) or distributed antenna system (DAS), comprising:

receiving, as part of a first standard messaging protocol distinct from a connectivity communications protocol, at least one of a user-plane message or control-plane message at an entity of the RAN or DAS;

generating, from the user-plane message or control-plane message, a modified message including transport connectivity information of the entity; and transmitting the modified message to another entity of the RAN or DAS via a second standard messaging protocol.

19. The method of claim 18, wherein the first and second standard messaging protocol comprises a synchronization signal block (SSB) protocol, a master information block (MIB) protocol, or a physical random access channel (PRACH) protocol.

20. The method of claim 18, wherein the connectivity communications protocol comprises a loop back messaging (LBM) protocol.

* * * * *